US008526779B2

(12) United States Patent
Simmons et al.

(10) Patent No.: US 8,526,779 B2
(45) Date of Patent: Sep. 3, 2013

(54) CREATING AND EDITING VIDEO RECORDED BY A HANDS-FREE VIDEO RECORDING DEVICE

(75) Inventors: Gordon Scott Simmons, Scotts Valley, CA (US); Romulus Pereira, Saratoga, CA (US); Justin Boland, Altadena, CA (US); Narayan Mohanran, Sunnyvale, CA (US)

(73) Assignee: Looxcie, Inc., Sunnyvale, CA (US)

( * ) Notice: Subject to any disclaimer, the term of this patent is extended or adjusted under 35 U.S.C. 154(b) by 440 days.

(21) Appl. No.: 12/882,189

(22) Filed: Sep. 14, 2010

(65) Prior Publication Data

US 2012/0063736 A1    Mar. 15, 2012

Related U.S. Application Data

(63) Continuation-in-part of application No. 12/612,972, filed on Nov. 5, 2009.

(60) Provisional application No. 61/112,666, filed on Nov. 7, 2008.

(51) Int. Cl.
*H04N 5/77*    (2006.01)

(52) U.S. Cl.
CPC .................................. *H04N 5/772* (2013.01)
USPC ........... 386/227; 386/210; 386/224; 386/228; 348/231.99; 348/376

(58) Field of Classification Search
CPC .............................. H04N 5/772; H04N 1/2112
USPC .............. 348/115, 164, 208.99, 211.2, 211.4, 348/231.99, 376; 386/210, 224, 227, 228
See application file for complete search history.

(56) References Cited

U.S. PATENT DOCUMENTS

| 3,542,457 A | 11/1970 | Balding et al. |
| 4,051,534 A | 9/1977 | Dukich et al. |
| 4,398,799 A | 8/1983 | Swift |

(Continued)

FOREIGN PATENT DOCUMENTS

| JP | 2003204282 | 7/2003 |
| JP | 2006074671 | 3/2006 |

(Continued)

OTHER PUBLICATIONS

Non-Final Office Action for U.S. Appl. No. 12/612,980 dated Dec. 8, 2011, 17 pages.

(Continued)

*Primary Examiner* — Thai Tran
*Assistant Examiner* — Mishawn Dunn
(74) *Attorney, Agent, or Firm* — Blakely Sokoloff Taylor & Zafman, LLP

(57) ABSTRACT

A video recording hands-free device that includes a storage medium, an optical sensor to receive an input image signal, and a processor that is coupled to the storage medium and the optical sensor. The processor is configured to process the input image signal received from the optical sensor into an encoded video data stream and store the encoded video data stream as recorded video data in the storage medium. The processor is also configured to receive and process a video control command to create a video clip file from a logical segment of the recorded video data.

24 Claims, 11 Drawing Sheets

(56) References Cited

U.S. PATENT DOCUMENTS

| | | | |
|---|---|---|---|
| 4,425,586 A | 1/1984 | Miller | |
| 4,516,157 A | 5/1985 | Campbell | |
| 4,797,736 A | 1/1989 | Kloots et al. | |
| 5,091,719 A | 2/1992 | Beamon | |
| 5,189,512 A | 2/1993 | Cameron et al. | |
| 5,886,739 A | 3/1999 | Winningstad | |
| 6,233,389 B1 | 5/2001 | Barton et al. | |
| 6,307,526 B1 | 10/2001 | Mann | |
| 6,563,532 B1 | 5/2003 | Strub et al. | |
| 7,271,827 B2 | 9/2007 | Nister | |
| 7,331,666 B2 | 2/2008 | Swab et al. | |
| 7,450,841 B2 | 11/2008 | Jung | |
| 7,483,485 B2 | 1/2009 | Winningstad et al. | |
| 7,522,212 B2 | 4/2009 | Wang et al. | |
| D616,873 S | 6/2010 | Olivier | |
| 7,798,728 B2 | 9/2010 | Lee | |
| D633,935 S | 3/2011 | Kaplan et al. | |
| 2001/0012051 A1 | 8/2001 | Hara et al. | |
| 2004/0130501 A1 | 7/2004 | Kondo et al. | |
| 2005/0100311 A1 | 5/2005 | Hohenacker | |
| 2005/0198344 A1 | 9/2005 | Fujita | |
| 2005/0202857 A1 | 9/2005 | Seshadri et al. | |
| 2005/0278759 A1 | 12/2005 | Unger | |
| 2006/0139475 A1 | 6/2006 | Esch et al. | |
| 2007/0107028 A1 | 5/2007 | Monroe et al. | |
| 2007/0115764 A1 | 5/2007 | Ueki | |
| 2008/0063362 A1 | 3/2008 | Grigorian | |
| 2008/0072261 A1 | 3/2008 | Ralston et al. | |
| 2008/0080556 A1 | 4/2008 | Shimada | |
| 2008/0136819 A1 | 6/2008 | Shivas et al. | |
| 2008/0154610 A1 | 6/2008 | Mahlbacher | |
| 2008/0231684 A1 | 9/2008 | Underwood et al. | |
| 2008/0250101 A1 | 10/2008 | Tanaka et al. | |
| 2008/0266448 A1* | 10/2008 | Reiner et al. | 348/376 |
| 2008/0288986 A1 | 11/2008 | Foster et al. | |
| 2008/0311997 A1 | 12/2008 | Goossen et al. | |
| 2009/0189981 A1 | 7/2009 | Siann et al. | |
| 2009/0247245 A1 | 10/2009 | Strawn et al. | |
| 2009/0249405 A1 | 10/2009 | Karaoguz et al. | |
| 2009/0262205 A1* | 10/2009 | Smith | 348/211.4 |
| 2009/0300698 A1 | 12/2009 | Quigley et al. | |
| 2010/0109878 A1 | 5/2010 | Desrosiers | |
| 2010/0118158 A1* | 5/2010 | Boland et al. | 348/211.2 |
| 2010/0245585 A1* | 9/2010 | Fisher et al. | 348/164 |
| 2010/0306801 A1 | 12/2010 | Filippov et al. | |
| 2010/0328471 A1 | 12/2010 | Boland et al. | |
| 2011/0096168 A1 | 4/2011 | Siann et al. | |
| 2012/0148214 A1 | 6/2012 | Black | |
| 2012/0293522 A1 | 11/2012 | Ahmad et al. | |

FOREIGN PATENT DOCUMENTS

| | | |
|---|---|---|
| KR | 1020040024682 | 3/2004 |
| WO | WO-2006064170 | 6/2006 |
| WO | WO-2007116334 | 10/2007 |
| WO | WO-2008124786 | 10/2008 |

OTHER PUBLICATIONS

Non-Final Office Action for U.S. Appl. No. 12/612,972 dated Dec. 5, 2011, 16 pages.
Non-Final Office Action for U.S. Appl. No. 12/612,972 dated Apr. 23, 2012, 15 pages.
Non-Final Office Action for U.S. Appl. No. 12/612,972 dated Dec. 6, 2012, 16 pages.
Non-Final Office Action for U.S. Appl. No. 13/118,153 dated Jan. 4, 2013, 26 pages.
Non-Final Office Action for U.S. Appl. No. 13/118,146 dated Jan. 7, 2013, 16 pages.
International Preliminary Report on Patentability for Application No. PCT/US2009/063617 dated May 10, 2011, 4 pages.
International Search Report and Written Opinion for International Application No. PCT/US2012/039014 dated Dec. 18, 2012, 9 pages.
European Search Report for European Application No. 09825511.0 dated May 15, 2012, 5 pages.
www.Justodians.org/Stopping Evil.htm (no posting date found on website, http://www.archive.org/web/web.php generates a date of May 2, 2008), 5 pages.
Non-Final Office Action for U.S. Appl. No. 29/340,177 dated Mar. 15, 2011, 6 pages.
Notice of Allowance for U.S. Appl. No. 12/612,980 dated Apr. 5, 2012, 8 pages.
"GoPro. Be a HERO." http://gopro.com/, Homepage, 2012, Woodman Labs, Inc., last visited Dec. 6, 2012, 1 page.
International Search Report and Written Opinion for International Application No. PCT/US2009/063617 dated Jun. 23, 2010, 6 pages.
Contour, "Introducing CONTOURROAM2", http://contour.com/, Homepage, 2012, last visited Dec. 6, 2012, 1 page.
Tessera, "OptiMP Wafer-Level Camera Technology Flyer", www/tessera.com/technologies/imagingandoptics/waferleveloptics.aspx, retrieved on Jun. 22, 2009, (Feb. 2009), 5 pages.
Office Action for U.S. Appl. No. 13/118,136 dated Jan. 31, 2013, 22 pages.

* cited by examiner

CREATING AND EDITING VIDEO RECORDED BY A HANDS-FREE VIDEO RECORDING DEVICE

CROSS REFERENCE TO RELATED APPLICATIONS

This application is a continuation-in-part (CIP) of U.S. application Ser. No. 12/612,972, filed Nov. 5, 2009, entitled "Video Recording Camera Headset", which is a non-provisional of U.S. Provisional Application No. 61/112,666, filed Nov. 7, 2008, titled "Personal Video Recording Headset." The entire contents of application Ser. No. 12/612,972 are hereby incorporated by reference for all purposes.

FIELD OF THE INVENTION

The invention described herein is in the field of portable electronic devices, and more particularly to creating and editing video recorded by a hands-free video recording device.

BACKGROUND OF THE INVENTION

Portable or personal video recording (PVR) camera equipment, such as the ubiquitous HandyCam® Camcorder, has been widely available as a consumer electronics item for a number of years. Nonetheless, transport and accessibility limitations heretofore inherent in such equipment has limited personal video recording. Even with continued reductions in the form factor and expense of PVR camera equipment, because existing video recording functionality has not fully integrated with existing technological infrastructure, recordation of video remains far more removed from daily life than many other activities based on consumer electronics, like the wireless/cellular telephone for example.

One issue is that carrying PVR camera equipment, no matter what the size, is relatively cumbersome and significantly limits the activities in which the user recording video may participate. Furthermore, attempts at "hands-free" PVR camera equipment to date have generally resulted in rather cumbersome configurations of discrete components which are impractical for everyday use by the general public.

The temporal limitations of PVR camera equipment of any form factor to date is another issue which has limited the relevance of recorded video. Even if PVR camera equipment is readily accessible to an individual, for example as carried in a user's pocket, interesting but unexpected events are all but missed. For example, a vast number of videos accessible on video sharing websites, such as YouTube.com, are clips of chance events. However, virtually all of those videos suffer the same defect of the recording being initiated about 30 seconds to one minute too late to capture the entire event as it unfolded in real time. Typically, by the time a user realizes that a notable unplanned event is occurring, accesses and positions their PVR camera equipment, much of a non-premeditated event is missed.

Editing the recorded video from the PVR equipment is also difficult and cumbersome. Editing video typically requires the user to use a complicated video editing application on a personal computer to edit their recorded video. For example, to create a video clip from recorded video, the user seeks through the video to find the starting point of the clip of interest and mark it as start and seeks to find the ending of the clip of interest and mark it as end. The clip can then be made. However, it can be cumbersome to find the right starting or ending point, especially if the display is relatively small and/or is a touchscreen display. Historically, the amount of video that actually gets shared with others is considerably less than the video acquired (recorded). Even with the advent of computers and digital media, the vast majority of video remains unused. Furthermore, as time goes on, the relevance of the video to the user quickly diminishes.

SUMMARY

A video recording hands-free device for creating and editing video is described herein. In one embodiment, the video recording hands-free device includes a storage medium, an optical sensor to receive an input image signal, and a processor that is coupled to the storage medium and the optical sensor. The processor is configured to process the input image signal received from the optical sensor into an encoded video data stream and store the encoded video data stream as recorded video data in the storage medium. The processor is also configured to receive and process a video control command to create a video clip file from a logical segment of the recorded video data.

BRIEF DESCRIPTION OF THE DRAWINGS

Embodiments of the invention are particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

Figure 1:
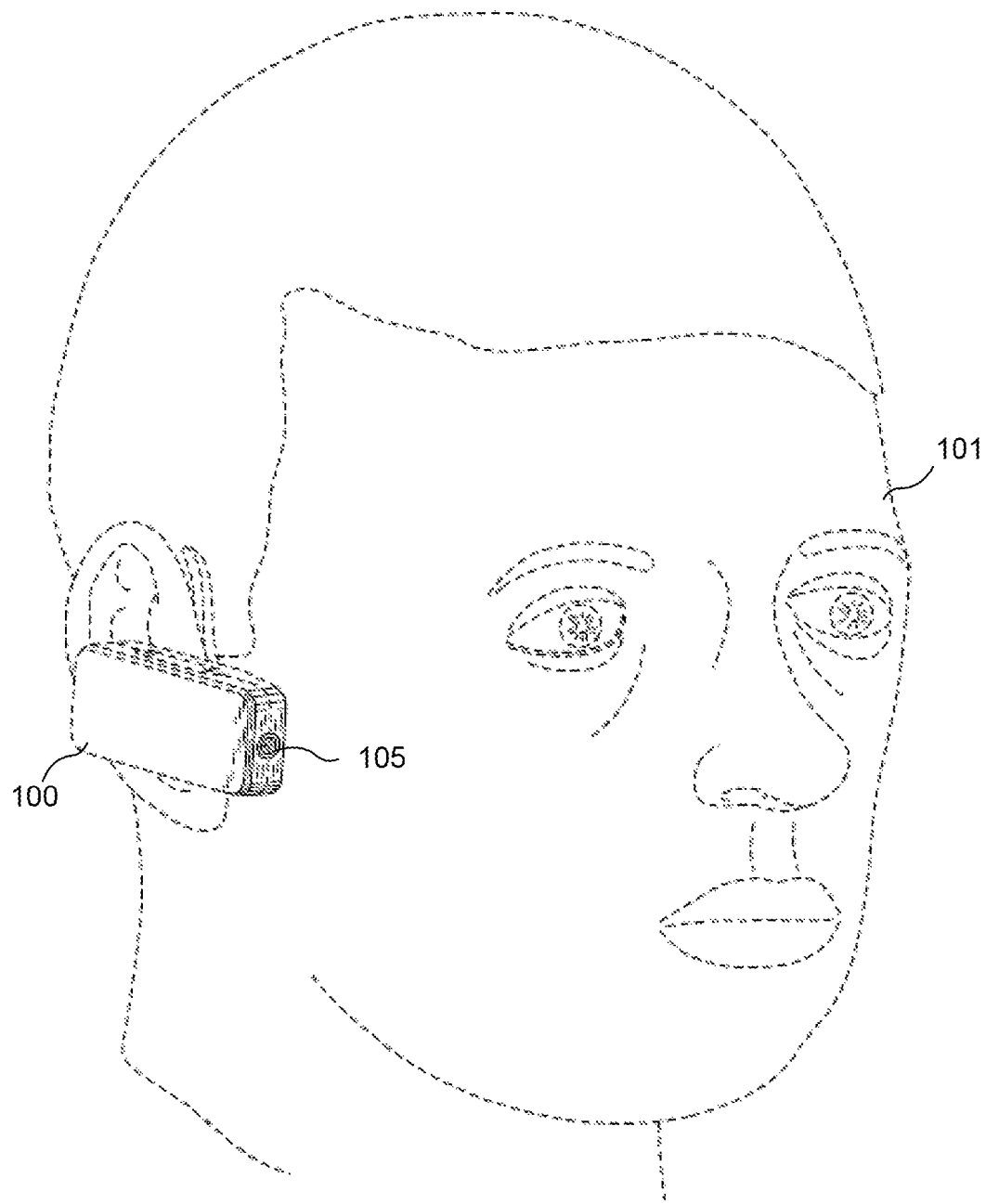
FIG. 1 depicts a wireless video recording headset positioned for use by a user, in accordance with an embodiment of the present invention.

For clarity of illustration, elements illustrated in the figures have not necessarily been drawn to scale. For example, the dimensions of some of the elements may be exaggerated relative to other elements.

DETAILED DESCRIPTION

In the following detailed description, numerous specific details are set forth in order to provide a thorough understanding of embodiments of the invention. However, it will be understood by those skilled in the art that other embodiments may be practiced without these specific details. In other instances, well-known methods, procedures, components and circuits have not been described in detail so as not to obscure the present invention. Those of ordinary skill in the art, with the included descriptions, will be able to implement appropriate functionality without undue experimentation.

Unless specifically stated or otherwise as apparent from the following discussion, it is appreciated that throughout the description, discussions utilizing terms such as "processing", "computing", "converting", "reconciling", "determining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g., as in a cause an effect relationship).

Disclosed herein are embodiments of a video recording camera system configured to record video from a user's perspective and/or edit the resulting video (or other recorded video) including generating video clips and/or sharing video clips with one or more destinations. In one embodiment, a hands-free device that is recording video (e.g., a video recording headset, a wearable camcorder, a video recording device in wearable glasses) receives a video control command to create a video clip file of a predetermined amount of recorded video (e.g., a predetermined amount of time, a predetermined size of video) based on a reference time. The video control command is received as a result of a user pressing a physical button or switch on the video recording hands-free device, or as a result of a user pressing or clicking on a virtual button (e.g., an icon representing a button in software) on a video control peripheral device. In response to receiving the video control command, the video recording hands-free device identifies a logical segment of recorded video data based on the reference time and for the predetermined amount of recorded video. The reference time may be based on the time at which the video control command was received by the video recording hands-free device or when it was issued. For example, in one embodiment, responsive to receiving the video control command, the video recording hands-free device creates a video clip of a predetermined amount (e.g., time, size, etc.) from video that was recorded immediately prior to the reference time (e.g., the last 30 seconds of video that was recorded). As another example, in one embodiment, responsive to receiving the video control command, the video recording hands-free device creates a video clip of a predetermined amount from video that was recorded immediately before the reference time and video that will be recorded immediately after the reference time (e.g., the last 15 seconds and next 15 seconds of video). As yet another example, in one embodiment, responsive to receiving the video control command, the video recording hands-free device creates a video clip of a predetermined amount from video that was recorded immediately after the reference time (e.g., the next 30 seconds of video). As a result of this command, the video clip is created relative to a real time event, unlike traditional editing applications that require mounting of the media into a console or editor and then performing a series of functions to create the desired clip, which typically takes place much after the event.

In one embodiment, a video recording hands-free device that is recording video receives a video control command that indicates both to create a video file of a predetermined amount of recorded video at a reference time and automatically shares that video file with one or more external destinations (e.g., one or more email recipients, one or more text message recipients, one or more social networking websites, one or more video sharing websites). The video control command is received as a result of a user pressing a physical button or switch on the video recording hands-free device, or as a result of a user pressing or clicking on a virtual button (e.g., an icon representing a button in software) on a video control peripheral device connected to the video recording hands-free device. Responsive to receiving the video control command, the video recording hands-free device identifies a logical segment of recorded video data based on the reference time and for the predetermined amount of recorded video. The reference time may be based on the time at which the video control command was received by the video recording hands-free device or when it was issued. For example, in one embodiment, responsive to receiving the video control command, the video recording hands-free device creates a video clip of a predetermined amount (e.g., time, size, etc.) from video that was recorded immediately prior to the reference time (e.g., the last 30 seconds of video that was recorded). As another example, in one embodiment, responsive to receiving the video control command, the video recording hands-free device creates a video clip of a predetermined amount from video that was recorded immediately before the reference time and video that will be recorded immediately after the reference time (e.g., the last 15 seconds and next 15 seconds of video). As yet another example, in one embodiment, responsive to receiving the video control command, the video recording hands-free device creates a video clip of a predetermined amount from video that was recorded immediately after the reference time (e.g., the next 30 seconds of video).

After creating the video clip, the video recording hands-free device sends the video clip to the video control peripheral device assuming a connection between the two (e.g., Bluetooth, 802.11, ZigBee, or other PAN (Personal Area Network) connections, 802.11 or other WLAN (Wireless Local Area Network) connections, etc.) is established (if it is not established, the video recording hands-free device marks the video clip as to be shared and will transmit it to the video control peripheral device when a connection is established). Responsive to receiving the video clip, the video control peripheral device determines whether video sharing is configured for one or more predefined destination(s) and if there is, shares the video clip with those destination(s) accordingly. For example, if a predefined destination is an email address, the video control peripheral device logs into an email account of the user and automatically composes and sends an email message to that email address. As another example, if a predefined destination is a video sharing website or a social networking website, the video control peripheral device automatically logs into an account for the video sharing website or social network website that was predefined by the user and uploads the video clip accordingly.

In one embodiment, a video recording hands-free device that is presently recording video and/or includes stored recorded video files is connected to a video control peripheral device that includes a video editing application that allows users to create a video clip from the video recorded by the video recording hands-free device without explicitly indicating the starting point and ending point of the video clip. The video control peripheral device includes or is coupled to a display to allow viewing of the recorded video (in one embodiment the video recording hands-free device does not include a display) both in reference to playing the recorded video as well as editing the recorded video. In one embodiment, the recorded video is streamed from the video recording hands-free device to the video control peripheral device on-demand (e.g., responsive to a user selecting a video to view), while in other embodiments the recorded video is downloaded and stored on the video control peripheral device and played locally. The video editing application on the video control peripheral device allows the user to seek through the recorded video until a specific segment of interest is located and input a single video control command that indicates that a video clip is to be generated relative to the frame that is displayed when the single video control command is input by the user. The video control peripheral device transmits the video control command, which identifies the frame of interest, to the video recording hands-free device. In response to receiving the video control command, the video recording hands-free device generates a video clip based on the video control command including automatically creating a starting point and ending point of the video clip based on the frame indicated in the video control command. In one embodiment, responsive to receiving the video control command, the video recording hands-free device creates a video clip of a predefined amount of video immediately before and after the frame indicated in the video control command (e.g., video corresponding to 15 seconds before the frame indicated in the video control command and 15 seconds after the frame indicated in the video control command). In another embodiment, responsive to receiving the video control command, the video recording hands-free device creates a video clip of a predefined amount of video immediately preceding the frame indicated in the video control command (e.g., 30 seconds previous to the frame indicated in the video control command). In another embodiment, responsive to receiving the video control command, the video recording hands-free device creates a video clip of a predefined amount of video immediately following the frame indicated in the video control command (e.g., 30 seconds after the frame indicated in the video control command).

In one embodiment, a video recording hands-free device that is presently recording video and/or includes stored recorded video files is connected to a video control peripheral device that includes a video editing application that allows users to create a video clip from the video recorded by the video recording hands-free device without explicitly indicating the starting point and ending point of the video clip and automatically share the created video clip with one or more predetermined destinations. The video control peripheral device includes or is coupled to a display to allow viewing of the recorded video (in one embodiment the video recording hands-free device does not include a display) both in reference to playing the recorded video as well as editing the recorded video. In one embodiment, the recorded video is streamed from the video recording hands-free device to the video control peripheral device on-demand (e.g., responsive to a user selecting a video to view), while in other embodiments the recorded video is downloaded and stored on the video control peripheral device and played locally. The video editing application on the video control peripheral device allows the user to seek through the recorded video until a specific segment of interest is located and input a single video control command that indicates that a video clip is to be generated relative to the frame that is displayed when the single video control command is input by the user and that corresponding video clip is to be automatically shared with one or more predetermined recipients. The video control peripheral device transmits the video control command, which identifies the frame of interest, to the video recording hands-free device. In response to receiving the video control command, the video recording hands-free device generates a video clip based on the video control command including automatically creating a starting point and ending point of the video clip based on the frame indicated in the video control command. In one embodiment, responsive to receiving the video control command, the video recording hands-free device creates a video clip of a predefined amount of video immediately before and after the frame indicated in the video control command (e.g., video corresponding to 15 seconds before the frame indicated in the video control command and 15 seconds after the frame indicated in the video control command). In another embodiment, responsive to receiving the video control command, the video recording hands-free device creates a video clip of a predefined amount of video immediately preceding the frame indicated in the video control command (e.g., 30 seconds previous to the frame indicated in the video control command). In another embodiment, responsive to receiving the video control command, the video recording hands-free device creates a video clip of a predefined amount of video immediately following the frame indicated in the video control command (e.g., 30 seconds after the frame indicated in the video control command).

After creating the video clip, the video recording hands-free device sends the video clip to the video control peripheral device assuming a connection between the two is established (if it is not established, the video recording hands-free device marks the video clip as to be shared and will transmit it to the video control peripheral device when a connection is established). Responsive to receiving the video clip, the video control peripheral device determines whether video sharing is configured for one or more predefined destination(s) and if there is, automatically shares the video clip with those destination(s) accordingly.

For example, if a predefined destination is an email address, the video control peripheral device logs into an email account of the user and automatically composes and sends an email message to that email address. As another example, if a predefined destination is a video sharing website or a social networking website, the video control peripheral device automatically logs into an account for the video sharing website or social network website that was predefined by the user and uploads the video clip accordingly.

In one embodiment, a video recording hands-free device that is presently recording video and/or includes stored recorded video files is connected to a video control peripheral device that includes a video editing application that allows users to delete a portion of the recorded video in the video buffer. The video control peripheral device includes or is coupled to a display to allow viewing of the recorded video (in one embodiment the video recording hands-free device does not include a display) both in reference to playing the recorded video as well as editing the recorded video. In one embodiment, the recorded video is streamed from the video recording hands-free device to the video control peripheral device on-demand (e.g., responsive to a user selecting a video to view), while in other embodiments the recorded video is downloaded and stored on the video control peripheral device and played locally. The video editing application on the video control peripheral device allows the user to seek through the recorded video until a specific segment of interest is located and input a single video control command that indicates that a predetermined amount of video relative to the segment of interest is to be deleted. The video control peripheral device transmits the video control command, which identifies the frame of interest, to the video recording hands-free device. In response to receiving the video control command, the video recording hands-free device deletes a portion of the recorded video in the recorded video buffer based on the frame indicated in the video control command. In one embodiment, responsive to receiving the video control command, the video recording hands-free device deletes a predefined amount of video data immediately before and after the frame indicated in the video control command (e.g., video corresponding to 15 seconds before the frame indicated in the video control command and 15 seconds after the frame indicated in the video control command). In another embodiment, responsive to receiving the video control command, the video recording hands-free device deletes a predefined amount of video data immediately preceding the frame indicated in the video control command (e.g., 30 seconds previous to the frame indicated in the video control command). In another embodiment, responsive to receiving the video control command, the video recording hands-free device deletes a predefined amount of video data immediately following the frame indicated in the video control command (e.g., 30 seconds after the frame indicated in the video control command).

FIG. 1 illustrates an exemplary video recording hands-free device 100 positioned on a user's head 101, in accordance with an embodiment of the present invention. As depicted in FIG. 1, the video recording hands-free device 100 is a video recording headset. The headset 100 includes a camera lens 105 through which image information is collected. In one embodiment, the exemplary video recording headset 100 has a form factor similar to non-video recording (i.e., audio-only) wireless headsets known in the art. In the exemplary embodiment depicted in FIG. 1, the video recording headset 100 is affixed to an ear of the user's head 101 thereby placing an audio speaker earpiece of the video recording headset 100 proximate to an auditory canal of the user's head 101 and further placing the camera lens 105 in a physical position proximate to a user's eyes to capture image data from a forward-looking perspective of the user's head 101. In embodiments, the optical path in the headset 100 is configured to record image data a user (wearer) views. While in some embodiments the video recording headset 100 does not include a display for viewing or previewing the recorded video; in other embodiments the video recording headset 100 includes one or more displays for viewing or previewing the recorded video. It should be understood that the form factor of the video recording headset 100 illustrated in FIG. 1 is exemplary and other, different physical styles of the video recording headset 100 may be used in embodiments of the invention.

In one embodiment, the video recording headset 100 is capable of being connected to a video control peripheral device (not depicted in FIG. 1 for simplicity purposes) (e.g., computing device such as a cellular-enabled wireless telephony handheld device or handset, a laptop, a desktop, a television, a set-top box, a tablet, a slate computing device, a wireless-enabled network portal device) through a wired connection or a wireless connection. As will be described in greater detail later herein, in some embodiments the video control peripheral device allows users to view and edit the video that is recorded by the video recording headset 100.

In one embodiment, the video recording headset 100 provides the dual function of both hands-free audio services for a video control peripheral device such as a cellular-enabled wireless telephony handheld device paired with the video recording headset 100 as well as hands-free video and/or audio recording. Thus in this embodiment, the video recording headset 100 additionally acts as an audio relay between the user and a user's handheld communication device in support of a telecommunication event (e.g., a phone call) in which the user's handheld communication device participates.

Figure 2:
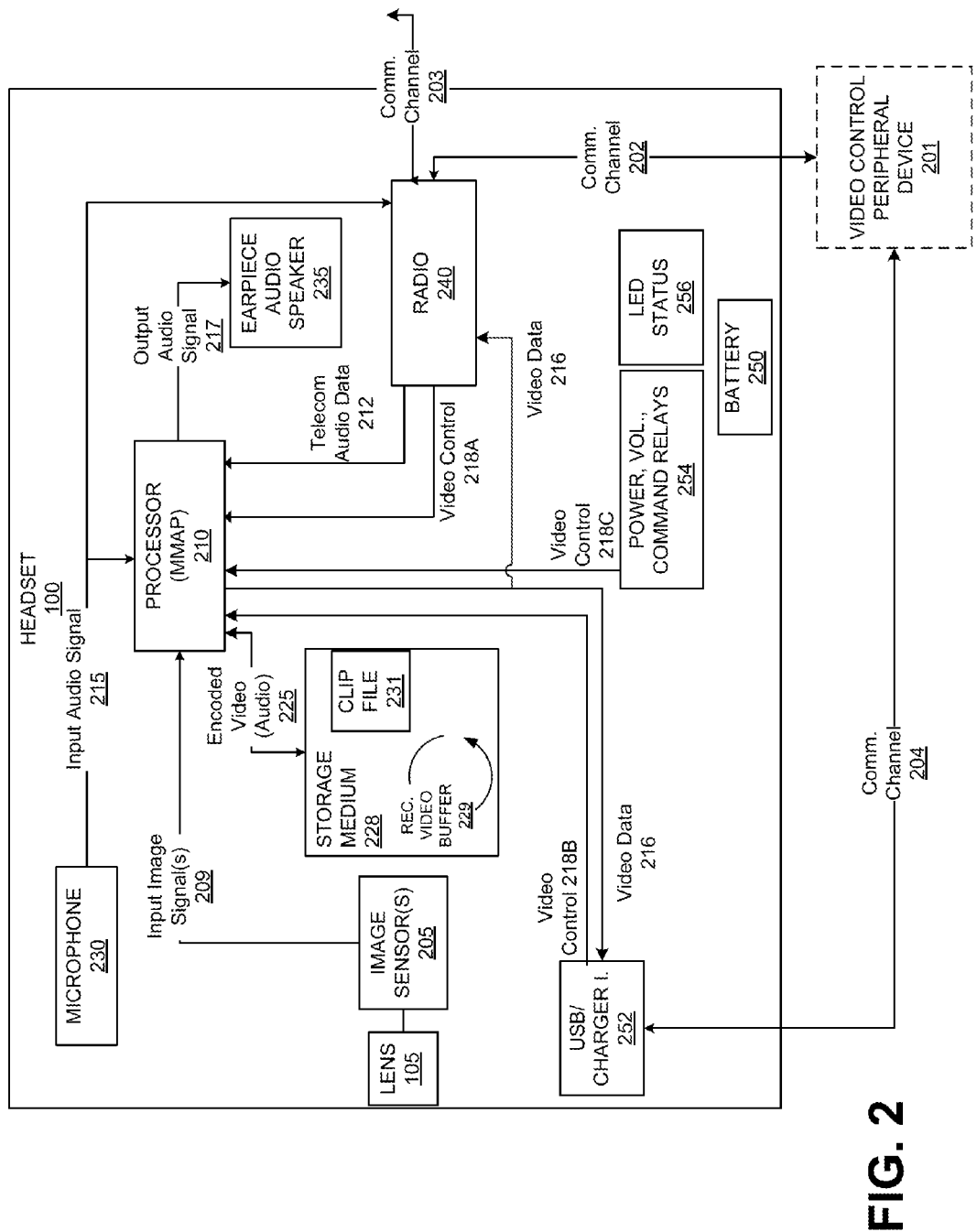
FIG. 2 depicts a functional block diagram of components of a wireless video recording headset, in accordance with an embodiment of the present invention.

FIG. 2 is a functional block diagram of components of the video recording headset 100 in accordance with an embodiment of the present invention. In one embodiment, the headset 100 includes all the components of a conventional audio-only wireless headset, such as an earpiece audio speaker 235 to provide an audible output audio signal 217 and at least one microphone 230 to capture an audible input audio signal 215. The headset 100 further includes a battery 250, a USB/Charger interface 252, power, volume, and video command relays 254 supporting switches disposed on an exterior surface of the headset 100. In one embodiment, one or more switches or buttons on the exterior surface of the headset 100 can be used to create a video clip of a predetermined amount of recorded video, and create and share a video clip of a predetermined amount of recorded video to one or more destinations. Additionally, one or more LED status indicators 256 are included in an exemplary embodiment of the headset 100 and can indicate when the headset 100 is recording and/or creating a video clip.

The video recording headset 100 further includes audio data and video data (i.e., A/V data) recording components. The microphone 230 may be dedicated to purpose of recording audio data to be combined with recorded video data or the microphone 230 may be shared between personal video recording functions and conventional hands-free telecommunication functions. In the exemplary embodiment, the microphone 230 is shared by piping the input audio signal 215 from the radio 240 back to the multimedia processor 210 for personal video recording functions. In alternative embodiments however, a separate microphone is utilized for noise cancelling/recording non-telecom audio in conjunction with video recording. For such an embodiment, a voice call would not be recorded on the video/audio stream unless both the separate microphones are enabled. In an exemplary embodiment, the video data recording pipeline includes at least a lens 105 coupled to one or more optical image sensors 205 to provide an input image signal(s) 209 to a processor 210. Processor 210 outputs an encoded video data 225 which will typically, but not necessarily, be accompanied by an encoded audio data stream which is not separately depicted. Video data 225 may also be compressed using any known data compression technique. Electronic video compression techniques enable low-frame rate video transfer via Bluetooth protocols. In an embodiment, the processor 210 compresses the input image signal 209 into digitally encoded video data with a lossy compression algorithm providing significantly greater than 10:1 compression. In one such embodiment, a Moving Pictures Experts Group (MPEG) 4 compliant CODEC is utilized by processor 210.

For economy of the description herein, it is understood that unless specifically indicated to be absent, an audio stream is accompanying a denoted video stream even where the audio stream is not specifically referenced. Thus, unless denoted or indicated otherwise, the video data 225 is a continuous stream of encoded audio and visual recorded information (e.g., h.264, MPEG, etc.). For example, in certain embodiments described in more detail elsewhere herein, the audio data accompanying the video data 225 may be eliminated such that the video data 225 is recorded to the storage medium 228 without the accompanying audio data.

The headset 100 further includes a storage medium 228 communicatively coupled to the processor 210 (e.g., through a data bus) over which the video data 225 is transferred for storage as recorded video data. The storage medium 228 may be any medium known in the art which offers sufficient storage density to provide minutes to hours of recorded video storage capacity, as a function of the video frame resolution, frame recording rate, and compression algorithms utilized, within the small form factor of a convention wireless headset. In a particular embodiment, the storage medium 228 is non-volatile random access memory (NVRAM), such as NAND flash. In one such embodiment, the NVRAM is provided in the form of a MultiMediaCard (MMC), Secure Digital (SD) card, and the like, which may be removable/swappable from the headset 100 and have gigabyte capacities. In alternative embodiments, the storage medium 228 is in a minidisc (magnetic or optical) format The storage medium 228 provides non-volatile local storage for video data 225 and may also be logically partitioned to further store any one of operating system files, diver files, configuration files, boot loaders, and any other similar operational files. In one embodiment where the storage medium 228 is an MMC, the storage medium 228 is dedicated to the storage of video data 225 while headset operational files are stored in a separate memory, integrated into the processor 210, for example. In an embodiment, the storage medium 228 is configured to provide a recorded video data buffer 229 that stores all the video data 225 as it is streamed from processor 210. In an exemplary embodiment, the processor 210 manages and writes to the storage medium 228 in a manner such that the recorded video data buffer 229 is a circular buffer whereby upon reaching a capacity of the buffer to store the video data 225 as recorded video, the oldest video data stored in the recorded video data buffer 229 is over-written by the new video data 225 stored to the buffer. Such a circular buffer may be implemented in any manner known in the art which provides a mechanism for mapping storage locations to a time-based logical data sequence so that "oldest" recorded video data is replaced with the "newest" data recorded. For example, a system of pointers may define the current buffer location (e.g., address within the storage medium 228) and may sequentially increment the location in a cyclic nature through the buffer addresses to ensure the current buffer address(es) to be written to next (e.g., with the video data frame most recently streamed from the processor 210) is moved to the location of the oldest stored data or most recently erased buffer location.

In certain embodiments, each frame of video data 225 is associated with metadata including a time stamp assigned to the video frame based on a clock of the video recording headset 100. In one embodiment, the clock is periodically synchronized with a real time clock through the video control peripheral device. The video data 225 corresponding to each video frame is then stored to the storage medium 228 along with the time stamp. This process continues without loss of any video frame data previously recorded to the recorded video data buffer 229 until the recorded video data buffer 229 reaches a threshold buffer capacity. Upon reaching the capacity threshold, the processor 210 begins to replace the video frame associated with the earliest time stamp with the video frame to be newly recorded to the recorded video data buffer 229. The newly recorded video frame is associated with a later time stamp than the previously recorded video frame (i.e., the time stamp of the oldest video frame is also replaced with a new time stamp). This replacement process may be performed on a frame-by-frame basis or may be performed on a multi-frame basis dependent on at least the storage medium architecture.

In some embodiments, the video data 225 is also associated with other metadata information. For example, in addition to the time stamp, the other metadata that can be associated with one or more of each frame of video data 225 includes: location data (e.g., GPS (Global Positioning System) coordinates (supplied from the video recording headset 100 if a GPS receiver is included in the headset or supplied from the video control peripheral device 201 when connected to the video recording headset 100 as it is recording); a phone number or other identifier of the video control peripheral device 201; or other external reference data supplied by the video control peripheral device 201).

In one embodiment where the storage medium 228 is a flash memory and a conventional data streaming protocol is utilized by the processor 210, upon reaching a threshold buffer capacity, the processor 210 erases a subset of the storage locations in the storage medium 228 which store data including the logically oldest streamed video frame (e.g., data marked to correspond to the earliest time stamp). The processor 210 then writes to the erased subset of storage locations data corresponding to the logically newest streamed video frame. Such an alternating "erase old/write new" process may continue iteratively and in an incremental fashion during operation of the headset 100. Depending on the size of the subset of storage locations (e.g., memory sector, memory block, memory page, etc.) erased with each increment, one or more new video data frames may be stored between each memory erase. As one example, the subset of storage locations incrementally erased is equal to one partition of the memory so that a first memory partition containing one or more frames of the logically oldest video data is erased concurrently while one or more frames of the logically newest video data is written to a second memory partition that was previously erased. Before the second memory partition is filled, the first memory partition has completed the erase in preparation for storing new video data output from the processor 210.

In alternative non-flash embodiments, for example where the storage medium 228 is a non-volatile memory such as phase change memory (PCM) or another memory type supporting cell-level reprogramming, memory addresses may be sequentially incremented and when the capacity threshold of the recorded video data buffer 229 is reached, the memory addresses storing the oldest video frame are reprogrammed to store the most recently received video frame. Alternatively, a map between memory addresses and the sequenced video frames of the video data 225 is updated and when the capacity threshold of the recorded video data buffer 229 is reached, the memory addresses storing the oldest video frame are reprogrammed to store the most recently received video frame.

Depending on the capacity of storage medium 228 and the stream rate of the video data 225, the recorded video data buffer 229 may store anywhere from minutes to many hours of recorded video data. As an example, with MPEG-4 compression, a 4 GB NVRAM is sufficient to store at least one hour of VGA video frames recorded at 30 frames/sec.

The recorded video data buffer 229 enables the video recording headset 100 to be in a continuous video recording mode, cycling recently recorded video through the buffer. In this manner the headset 100 may be operated in an "always recording" mode to advantageously leverage the location of the lens 105 when the headset 100 is worn by a user in a ready position. It should also be appreciated that even though the recorded video data buffer 229 is non-volatile buffer (e.g., provided by the storage medium 228) in the preferred embodiments, a volatile memory buffer (e.g., SRAM or DRAM) may also be utilized for the recorded video data buffer 229. In such alternative embodiments, the size of the volatile memory buffer is still to be sufficient to store at least one hour of VGA video frames recorded at 30 frames/sec (as to be distinguished from a significantly smaller volatile-cache buffers that might be used to prevent over and under runs during video streaming).

In an embodiment, the storage medium 228 further includes storage for video clip file(s) 231. A video clip file 231 is a logical segment of recorded video which has been extracted or logically partitioned from the recorded video data buffer 229. The video clip file(s) 231 may be generated from the data from the recorded video data buffer 229 or may be directly stored bypassing the recorded video data buffer 229. In one embodiment, the video clip file(s) 231 are stored on the video recording headset 100 until they are deleted by a user. In such an embodiment, the video clip file(s) 231 have more permanence than the video stored in the recorded video data buffer 229 since they are not subject to being automatically overwritten in the normal course of video recording as the video data stored in the recorded video data buffer 229.

As will be described in greater detail later herein, the clip file(s) 231 may be generated in response to the headset 100 receiving a video control command to create the video clip file(s) of a predetermined amount of recorded video from the recorded video data buffer 229 at a reference time relative to receipt of the video control command. For example, while the video recording headset 100 is currently recording and storing video to the recorded video data buffer 229 and responsive to receiving input from the user to create a video clip, the video recording headset 100 identifies a logical segment of recorded video and creates and stores the video clip file 231. The input may be received through a user pressing a button or switch on the video control headset that causes the video control command to be generated or the user can press or click a virtual button on a video control peripheral device that causes the video control command to be transmitted to the video recording headset 100.

In one embodiment the clip file(s) 231 may be stored within a section of the storage medium 228 managed under a file system, such as a flash file system. In one such embodiment, the storage medium 228 includes a first NVRAM chip configured as the recorded video data buffer 229 and a second NVRAM chip configured as clip file storage. In alternative embodiment, the data recorded to the video data buffer 229 is stored in a first logical portion of the storage medium 228 and the clip file(s) 231 are stored in a second logical portion of the storage medium 228. In this situation, when a logical segment of video stored in the recorded video data buffer 229 is identified as a clip file 231, the logical partition of the memory storing that logical video segment is associated with a clip file name and protected from being overwritten by new video data recorded to the recorded video data buffer 229. As such, the capacity of the recorded video data buffer 229 may be dynamically allocated from the storage medium 228, the buffer becoming smaller (i.e., buffered video data is more frequently overwritten) with each clip file 231 saved off of the recorded video data buffer 229. Logical partitioning of the clip file(s) 231 in this manner advantageously eliminates the overhead of reading out and rewriting logical segments of recorded video as part of saving a clip file 231 off of the recorded video data buffer 229. In alternative embodiments, the clip file(s) 231 are stored in a separate storage medium of the video recording headset 100.

The continuous video recording mode allows a digital video recording (DVR)-like capability to the video recording system. For example, in one embodiment, where the video recording headset 100 is recording video essentially at all times (assuming that the video recording headset 100 is powered on), non-premeditated events incidentally witnessed by the user wearing the headset 100 will be recorded to the video data buffer 229. The video data buffer 229 may then be accessed sometime thereafter and a video clip file 231 created to include the logical segment of the recorded video buffer which completely captures the non-premeditated event. In essence, the always live recording capability enables one to go back in recorded time and produce a video clip as if a record button on the camera was turned on just in time to capture any event.

As illustrated in FIG. 2, the video recording headset is coupled with the video control peripheral device 201. In one embodiment, the headset 100 may bypass the storage medium 228 and instead, wirelessly transmit captured video and/or audio data to storage media contained in the video control peripheral device 201. For example, video and/or audio data may be transmitted by the radio 240 as the video data 225 is streamed from the processor 210. Where the radio 240 has a data rate less than half of the video recording pipeline (e.g., Bluetooth compliant embodiments), the headset 100 may utilize the storage medium 228 or volatile memory to buffer the video data 225 during transmission to the video control peripheral device 201.

In an embodiment, the processor 210 is to provide video data 216 to radio 240 for wireless transmission of the image data traffic over the communication channel 202 to the video control peripheral device 201 or over the communication channel 203 to a wireless base station. The processor 210 may also digitally encode the input and output audio signals to/from the audio data 212 communicated via the radio 240. In an exemplary embodiment where the communication channel 202 is Bluetooth compliant over which mono-aural audio data is relayed, the video data 216 is transmitted over that same Bluetooth compliant communication channel 202. Video data 216 may include any portion of the video data recorded to the storage medium 228. In particular embodiments, video data 216 includes frames of recorded video accessed from the circular recorded video data buffer 229. In one embodiment where the recorded video data is compressed by Moving Pictures Experts Group (MPEG) 4 compliant CODEC, the video data 216 includes intra coded video frames (I-frames). In other embodiments, video data 216 includes an entire logical segment of recorded video saved as the video clip file 231, which may be seconds or minutes long in duration, for example. In such an embodiment, the Video data 216 may include I-frames, B-frames, or P-frames.

The processor 210 may be implemented as one or more microcontrollers and/or digital signal processors (DSP) and one or more of the functions described to be performed by processor 210 may be performed by any one of those microcontrollers and/or DSPs integrated in any number of configurations, for example as a system on a chip (SOC). Generally, the processor 210 is a low power device (e.g., ARM or AVR processor) configured to control the video data from the imaging pipeline and convert it to a compressed format that can be recorded to the storage medium 228. The processor 210 may further be configured to control the data from the microphone to synchronize recorded audio data with recorded video data and/or switch the input audio signal 215 to be output by the radio 240 as the audio data 212 or output to the storage medium 228 as a component associated with the video data 225, as further described elsewhere herein.

In some embodiments, the radio 240 relays audio data 212 over communication channel 202 to a video control peripheral device 201 in support of telecommunication events conducted by the video control peripheral device 201 (e.g., calls received or placed by the video control peripheral device 201). The radio 240 also transmits the video data 216 and receives the video control commands 218, for example over the communication channels 202 and/or 203. The radio 240 may be any conventional personal area network (PAN) transceiver, such as, but not limited to, a Bluetooth wireless (e.g., IEEE 802.15.1) and/or Wi-Fi (e.g., IEEE 802.11x) compliant radio, and/or ZigBee (e.g., IEEE 802.15.4-2003). In particular Bluetooth embodiments, radio 240 may be provided as a component in the BC04 or BC05 module commercially available from Cambridge Silicon Radio (CSR) of Cambridge, England, as an example. The radio 240 may be connected to the processor 210 via a universal asynchronous receiver/transmitter (UART), for example. While the video control peripheral device 201 will typically include a small FIFO buffer, the video control peripheral device 201 or the video recording headset 100 may still lose data bytes over the communication channel 202. For this reason, the communication path may include packet framing over UART (Star/End framing), CRC and ACK for command and control packets (e.g., video control commands 218). The ACK may be in the form of a response which will contain the results of the command. Communication of the audio data 212 and the video data 216 packets may or may not include CRC.

In an embodiment, the processor 210 is to further receive video control commands, such as video control commands 218A, 218B, and 218C. The video control commands 218A-C include one or more commands that control and/or configure the video recording and editing capabilities of the video recording headset 100. The video control commands 218A are received from the radio 240 that were transmitted wirelessly over the communication channel 202 as sent from the video control peripheral device 201. The video control commands 218B are received from the USB/Charger interface 252 (or other wired interface) that were transmitted over the wired communication channel 204 as sent from the video control peripheral device 201. In one embodiment, the video control commands 218A and 218B are issued by the video control peripheral device 201 in response to it receiving a user's selection of such a command via a user interface on the video control peripheral device 201 (e.g., through a video editing and sharing application). The video control commands 218C are received from the video command relays 254 in response to a user pressing an external button or activating a switch on the video recording headset 100. Thus, the relays 254 provide direct access to at least some of the video recording operations of the video recording headset 100 in a stand-alone mode whereby at least some of the video recording operations described herein may be performed without the video control peripheral device 201. For such stand-alone embodiments, a user of the video recording headset 100 can actuate the relays 254 (e.g., via buttons present on an external surface of the headset) to, for example, activate/deactivate video recording, create a video clip 231, create a video clip 231 and cause that video clip 231 to be shared with one or more destinations, or change a FOV.

One example of a video control command 218 that can be received is a video control command 218 that directs the processor 210 to create a video clip file 231 of a predetermined amount of recorded video (e.g., a predetermined amount of time, a predetermined size of video) from the recorded video buffer 229 relative to a reference time when the video control command is received or processed (e.g., the previous X seconds of video stored in the recorded video buffer 229, the previous Y seconds of video stored in the recorded video buffer 229 and the next Z seconds of video data that will be stored, or the next W seconds of video data that will be stored in the recorded video buffer 229). This type of video control command is sometimes referred herein as an "instant-clip video control command." The instant-clip video control command may be received from the video command relays 254 in response to a user pressing an external button or activating a switch on the video recording headset 100 or received from the video control peripheral device 201 either from the wireless communication channel 202 or from the wired communication channel 204. In one embodiment, an audio tone is produced through the earpiece audio speaker 235 as a result of the user pressing an external button or activating a switch on the video recording headset 100 to issue the instant-clip video control command or when the instant-clip video control command is received as a result of the user pressing a virtual button or soft key on the video control peripheral device 201.

As another example, a video control command can be received that directs the processor 210 to both create a video clip file 231 of a predetermined amount of recorded video from the recorded video buffer 229 relative to a reference time as well as share that created video clip file with one or more destinations (which may be predefined). This type of video control command is sometimes referred herein as an "instant-clip and share video control command." The instant-clip and share video control command may be received from the video command relays 254 in response to a user pressing an external button or activating a switch on the video recording headset 100 or received from the video control peripheral device 201 either from the wireless communication channel 202 or from the wired communication channel 204. In one embodiment, a user can use the same physical button or switch that is used to issue the instant-clip and share video control command as the instant-clip video control command, by performing a long press (holding down the button for a longer period of time) of the button. In one embodiment, an audio tone is produced through the earpiece audio speaker 235 as a result of the instant-clip and share video control command being issued (the audio tone may be the same or different than the audio tone produced as a result of the instant-clip video control command).

As another example, a video control command can be received that directs the processor 210 to create a video clip file 231 from video data stored either in the recorded video buffer 229 or from a different video clip file 231. This video control command indicates a frame of interest of the video data that the processor 210 uses when creating the video clip file 231. For example, the processor 210 may generate a video clip file of the previous X seconds of video from the frame of interest and/or the following Y seconds of video from the frame of interest. This type of video control command is sometimes referred herein as an "instant-scoop video control command." The instant-scoop video control command is typically generated responsive to a user using the video control peripheral device 201 to seek through a recorded video to identify a segment of interest and provide a single input command when that segment of interest is located. In contrast to the instant-clip video control command which causes the video recording headset 100 to create a video clip file 231 from video in the recorded video buffer 229 relative to when the command is received or processed, the instant-scoop video control command causes the video recording headset 100 to create a video clip file based on the segment of interest indicated in the command which typically corresponds to different video being recorded when the instant-scoop video control command is received. For example, the instant-scoop video control command is typically used to edit video that is already recorded and stored whereas the instant-clip video control command is typically used to create impromptu video clip files as events have just happened or are presently happening. Although the instant-scoop video control command is typically received from the video control peripheral device 201 either through the wireless communication channel 202 or through the wired communication channel 204, in embodiments where the video recording headset 100 includes a display, the instant-scoop video control command can be generated locally on the video recording headset 100. In one embodiment, an audio tone is produced through the earpiece audio speaker 235 as a result of the instant-scoop video control command being issued.

As another example, a video control command can be received that directs the processor 210 to both create a video clip file 231 from video data stored either in the recorded video buffer 229 or from a different video clip file 231 (similar to the instant-scoop video control command) as well as share that created video clip file with one or more destinations. This type of video control command is sometimes referred herein as an "instant-scoop and share video control command." Although the instant-scoop and share video control command is typically received from the video control peripheral device 201 either through the wireless communication channel 202 or through the wired communication channel 204, in embodiments where the video recording headset 100 includes a display, the instant-scoop video control command can be generated locally on the video recording headset 100. In one embodiment, an audio tone is produced through the earpiece audio speaker 235 as a result of the instant-scoop and share video control command being issued.

As yet another example, a video control command can be received that directs the processor 210 to share a video clip file 231 that has been previously generated and stored in the video recording headset 100 with one or more destinations. For example, a user may use the video control peripheral device 201 to view and select a video clip file 231 to share with one or more destinations. This type of video control command is sometimes referred herein as a "share video control command." In one embodiment, an audio tone is produced through the earpiece audio speaker 235 as a result of the share video control command being issued. In one embodiment, the audio tone that is produced is distinct from any tones that are generated when a video clip is created and stored thereby indicating to the user that the clip is to be shared.

As yet another example, a video control command can be received that directs the processor 210 to delete a predetermined amount of video data from the recorded video buffer 229 or the video clip file(s) 231. This video control command indicates a frame of interest of the video data that the processor 210 uses when deleting the video data. For example, the processor 210 may delete video of the previous X seconds of video stored in the recorded video buffer 229 relative to the frame of interest, the previous Y seconds of video stored in the recorded video buffer 229 and the next Z seconds of video data relative to the frame of interest, or the next W seconds of video data relative to the frame of interest. This type of video control command is sometimes referred herein as an "instant-hole video control command." The instant-hole video control command is typically generated responsive to a user using the video control peripheral device 201 to seek through recorded video to identify a segment of interest to delete and provide a single input command when that segment of interest is located to cause a portion of the video to be deleted. Although the instant-hole video control command is typically received from the video control peripheral device 201 either through the wireless communication channel 202 or through the wired communication channel 204, in embodiments where the video recording headset 100 includes a display, the instant-hole video control command can be generated locally on the video recording headset 100. In one embodiment, an audio tone is produced through the earpiece audio speaker 235 as a result of the instant-hole video control command being issued.

In one embodiment, to delete the video from a portion of video (e.g., a portion of video in the recorded video buffer 229), the processor 210 causes blank video frames to replace those frames of the video portion to be deleted and blank audio frames to replace the audio frames that correspond to the video portion to be deleted. In such an embodiment, when a user seeks through the video after those frames are deleted, the user will see a gap or hole in the recorded video. In another embodiment, to delete the video from a portion of video, the processor 210 causes the last frame before the start of the logical segment of frames to delete, and the next frame after the end of the logical segment, to be associated or linked such that when a user seeks through the video, the video will transition from the last frame before the start of the logical segment to the next frame after the end of the logical segment thereby skipping the deleted frames.

Other video control commands may be received including commands for selecting video clip file(s) 231, seeking through the video data (both the video data stored in the recorded video buffer 229 and the clip file(s) 231), playing the video data, deleting the video data (both the video data stored in the recorded video buffer 229 and the clip file(s) 231), adding metadata to the video clip file(s) 231 (e.g., title, author, etc.).

In the depicted embodiment illustrated in FIG. 2, the same communication channel 202 for conducting audio data 212 (e.g., in support of a call to/from the video control peripheral device 201) is extended to further conduct both video data 216, as recorded by the video recording headset 100, and video control commands 218, received by the video recording headset 100. In alternate embodiments however, additional channels may be provisioned and separately utilized for transmission of the video data 216 and/or video control commands 218.

Figure 3:
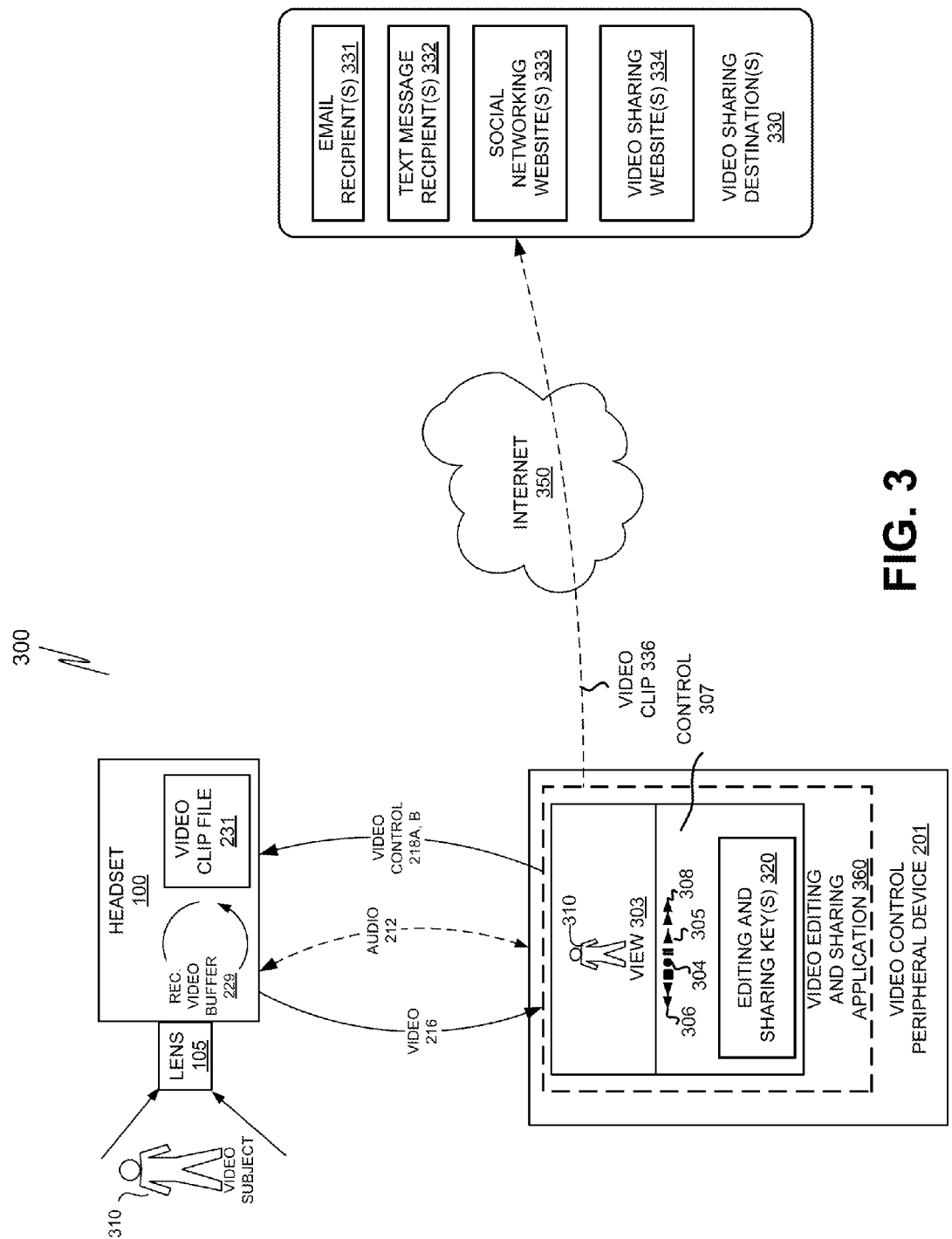
FIG. 3 depicts a video recording and editing system including the video recording headset in communication with a video control peripheral device and sharing video with one or more destinations, in accordance with an embodiment of the present invention.

FIG. 3 depicts a video recording and editing system 300 including the video recording headset 100 in communication with the video control peripheral device 201 and sharing video with one or more destinations. In the embodiment depicted, the video recording headset 100 senses image signals of video subject 310 through the lens 105, the image signals are then processed (e.g., digitized, compressed, etc.) and stored as video data to a storage medium disposed within the headset 100. The video recording headset 100 is connected to the video control peripheral device 201 either wirelessly or through a wired connection. In embodiments where the video control peripheral device 201 is a wireless communication handset, it is connected with the video recording headset 101 in peering mode or in headset/handset mode. The video control peripheral device 201 may include the view screen 303 that serves as a viewfinder for the video recording headset 100 for previewing and viewing video recorded by the video recording headset 100. In some embodiments the video control peripheral device 201 does not include a view screen (e.g., if the video control peripheral device is a wireless-enabled network portal device). As illustrated in FIG. 3, the video control peripheral device 201 includes a connection to the Internet 350 (the connection may be a wireless connection such as a cellular connection, Wi-Fi, etc., or may be a wired connection).

In some embodiments, the video recording headset 100 interacts with the video control peripheral device 201 by providing a wireless two-way relaying of the audio data 212 in addition to wirelessly transmitting the video data 216 (which may include video clips) to the video control peripheral device 201 for viewing and/or sharing the video data 216 with one or more of the video sharing destinations 330. The video recording headset 100 further receives the video control commands 218A and/or 218B from the video control peripheral device 201. In response to different ones of the video control commands 218A and/or 218B, the video recording handset is configured to: start or stop headset video recording; create a video clip file 231; display a listing of video clip files stored on the headset 100; preview a selected video clip file 231 (e.g., at a lower frame-rate than recorded); share a selected video clip file 231 to one or more remote destinations; initiate or halt a live video feed from the headset 100; delete a video clip file 231; configure the headset video capture parameters (e.g., recording rates and levels, image formats, zooms; etc); and edit previously recorded video clip files.

The video control peripheral device 201 may include application software, which may be configured as a set of multiple modules including a custom data communication driver with which one or more of the video data 216 and video control commands 218A may be transferred with the headset 100 over the communication channel 202. The communication profiles supported may include an audio headset profile over Synchronous Connection Oriented Link (SCO) and object Push protocol (over ACL—used by vCard applications). In certain embodiments, RFCOMM/SPP in a handheld device is utilized to provide dial-up networking (DUN) profiles. In such an embodiment a DUN profile is utilized for communication between the PVR headset and a handheld device. In a further embodiment, Logical Link Control and Adaptation Protocol (L2CAP) layer is utilized to connect the PVR headset to the handheld device (on a proprietary protocol). Any such protocol may provide semi-lossless transport capabilities such that an occasional data packet (e.g., video data) may be dropped, but a control/command packet is not. The protocol definition may provide for a system of ACK and retransmission of commands (and potentially the responses by remembering the last command). The ACK can be in the form of a response to the command/control packet. In one embodiment, there is only one outstanding request at a time.

In some embodiments, the video recording headset 100 continuously transmits the video data 216 to the video control peripheral device 201 as it is recording the video subject 310 (or other subject) so that the video control peripheral device 201 can display a real-time view of what is being captured by the video recording headset 100. For example, as depicted, a frame containing the video subject 310, as recorded by the video recording headset 100, and transmitted as video data 216, is displayed in the view screen 303. In some embodiments, this bifurcation of the video recorder camera pickup and the video recorder controller allows the video recording headset 100 to retain a form factor of a conventional audio-only headset and leverages the existing technological infrastructure (e.g., data service connectivity, video display and processing, etc.) provided by the video control peripheral device 201.

In embodiments, the video control peripheral device 201 issues the video control commands 218A or 218B (depending on the connection type to the video recording headset 100) to control various aspects of the recording, editing, and/or sharing of video. As illustrated in FIG. 3, the video control peripheral device 201 includes the video editing and sharing application 360 which includes the video control soft keys 307 to provide a user video control interface. Video control soft keys 307 include a record button 304, which when pressed or selected causes a record video control command to be transmitted to the video recording headset 100 to cause the headset 100 to enter a video recording state. In addition, the video control soft keys 307 include a play button 305, which when pressed or selected causes a play command to be transmitted to the video recording headset 100 (if the selected video file is stored on the video recording headset 100) to play the selected video (the selected video would be streamed to the video control peripheral device for display), or if the selected video file is stored locally on the video control peripheral device, cause that video to be played. The video control soft keys 307 further include a forward index 308 and backward index 306 to enable a user to seek through a video which causes video control command(s) to be transmitted to the video recording headset 100 to traverse through logical segments of the recorded video (e.g., from the recorded video data buffer 229 or the video clip file(s) 231) and transmit the video 216 to the video control peripheral device accordingly.

The video control soft keys 307 also includes one or more editing and/or sharing keys 320. For example, the editing and/or sharing key(s) 320 may include one or more of the following: a key to cause, when selected by a user, an instant-clip video control command to be transmitted to the video recording headset 100; a key to cause, when selected by a user, an instant-clip and share video control command to be transmitted to the video recording headset 100; a key to cause, when selected by a user, an instant-scoop video control command to be transmitted to the video recording headset 100; a key to cause, when selected by a user, an instant-scoop and share video control command to be transmitted to the video recording headset 100; and a key to cause, when selected by a user, a share video control command to be transmitted to the video recording headset 100. The video editing and sharing application 360 may also allow a user to view and traverse through the video clip file(s) 231, edit titles and other metadata associated with the video clip file(s) 231, delete one or more of the video clip file(s) 231, etc. The video editing and sharing application 360 may also allow filtering of clips based on time of creation, whether they have been shared, sharing destination(s), etc.

In some embodiments, the video editing and sharing application 360 shares the video clips with one or more video sharing destination(s) 330 available through the Internet 350. In addition, in some embodiments, the video editing and sharing application 360 also allows the user to define one or more video sharing destination(s) 330 (e.g., one or more email recipients 331, one or more text message recipients 332, one or more social networking websites 333, and/or one or more video sharing websites 334) that will be used when sharing a video clip file 231. For example, the video editing and sharing application 360 allows a user to perform one or more of the following: enter in one or email addresses for intended recipients, enter in account credentials sufficient to log onto one or more email accounts, social networking website(s), and/or video sharing website(s).

In one embodiment, responsive to issuing a video control command that includes a share component (e.g., an instant-clip and share video control command, an instant-scoop and share video control command, or a share video control command) and consequently receiving a video clip file that is to be shared (which may be indicated by metadata associated with the video clip file that indicates that it is to be shared), the video editing and sharing application 360 determines the destination(s), logs into any necessary accounts, and shares the video clip file 336 accordingly. For example, if one of the video sharing destinations is an email recipient, the video editing and sharing application 360 logs into an email account of the user (if not already logged on) and automatically composes and sends an email message that includes the video clip file 336 to that email address.

Figure 4:
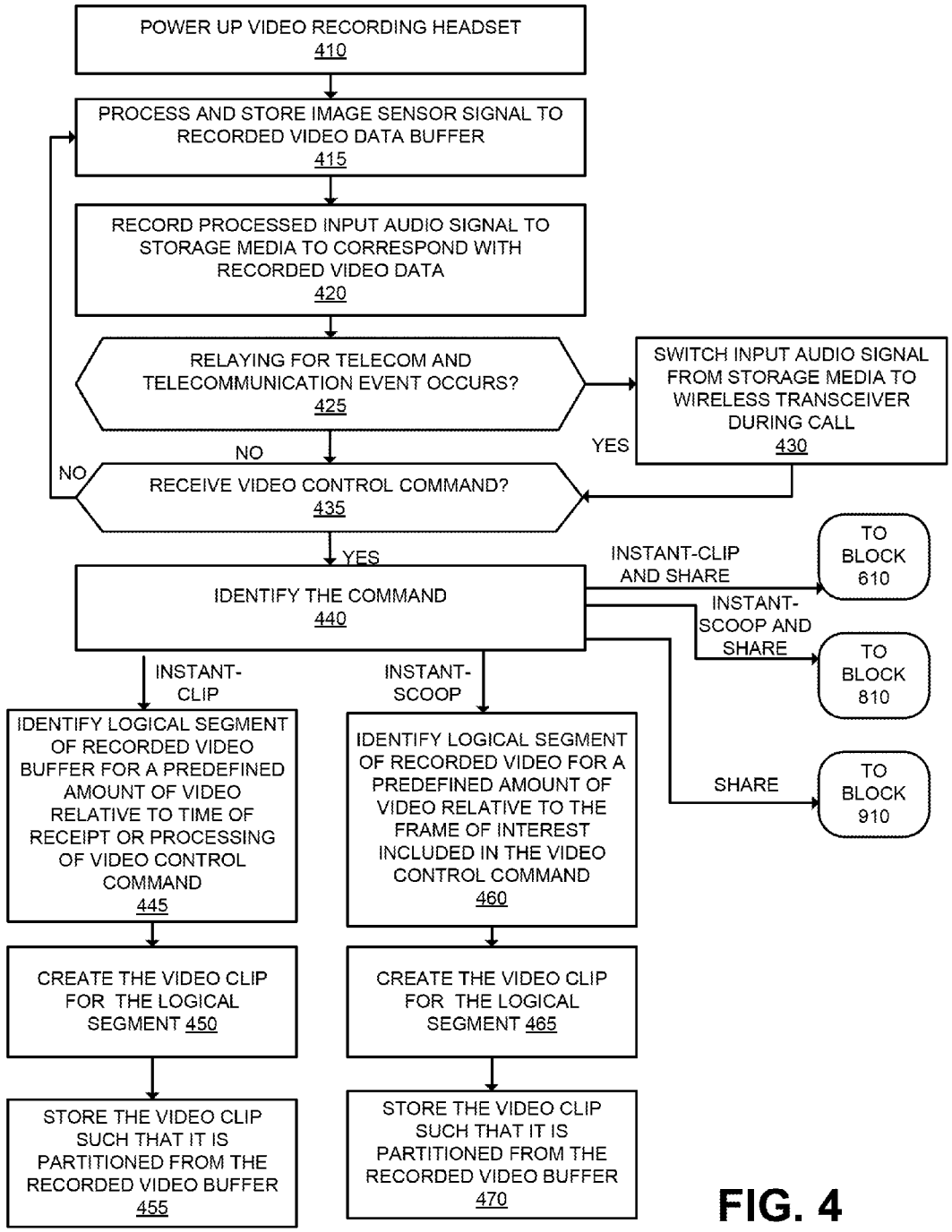
FIG. 4 is a flow diagram illustrating exemplary operations performed on a video recording headset for creating and/or sharing video clips, in accordance with an embodiment of the present invention.

FIG. 4 is a flow diagram illustrating exemplary operations performed on a video recording headset for creating and/or sharing video clips according to one embodiment. The operations of FIG. 4 will be described with reference to the exemplary embodiments of FIGS. 2 and 3. However, it should be understood that the operations of FIG. 4 can be performed by embodiments of the invention other than those discussed with reference to FIGS. 2 and 3 and the embodiments discussed with reference to FIGS. 2 and 3 can perform operations different than those discussed with reference to FIG. 4.

At operation 410, the video recording headset 100 is powered on and recording commences. For example, a user has pressed a power button located on the video recording headset 100. In some embodiments, the video recording headset 100 is recording at all times when the power is on, while in other embodiments an additional command must be received to turn on the video recording aspect of the video recording headset 100 (in such embodiments the command to turn on the video recording may be received from a connected video control peripheral device or may be received as a result of a user pressing a button on the video recording headset 100). Flow moves from operation 410 to operation 415.

At operation 415, the processor 210 processes the image sensor signal(s) 209 that are captured by the image sensor(s) 205 and stores them as a video component of the video data 225 to the recorded video data buffer 229. Flow then moves to operation 420 and the processor 210 processes the input audio signal 215 received from the headset microphone 230 as a corresponding audio component of the video data 225. However, it should be understood that in embodiments where the video recording headset 100 operations in video-only recording mode, the operation described in operation 420 is optional or skipped. For example, a "record mute video control command" may be received that indicates that the video recording headset 100 should operate in video-only recording mode.

At operation 425, a determination is made whether the video recording headset 100 is also acting as an audio relay between the user a video control peripheral device (e.g., a handheld communication device such as a cellular phone) and a telecommunication event (e.g., a phone call) has occurred. If yes, then flow moves to operation 430 where the processor 210 switches the input audio signal 215 from the storage medium 228 to the wireless transceiver to support the telecommunication event. As such, the input audio signal is not recorded along with the video data 225 during the telecommunication event. A user's voice tele-conversation is thereby excluded from the recorded video data buffer while the video data 225 continues to be stored during the telephone call. Upon completion of the call, the input audio signal 215 is switched back to provide an audio stream accompaniment to the video data 225. It should be appreciated that this behavior may be user configurable so that in an alternate embodiment, at operation 430, the headset, rather than switching the input audio signal 215 off during a voice call, instead continues recording the input audio signal 215 along with the output audio signal 217 as an accompaniment to the video data 225 to record both sides of the telephone conversion as part of the A/V data stored to the recorded video data buffer 229. If the video recording headset 100 is not acting as an audio relay and/or a telecommunication event has not occurred, then flow moves to operation 435.

At operation 435, a determination is made whether a video control command is received. If a video control command is not received, then flow moves back to operation 415. Thus, as depicted in FIG. 4, in one embodiment the recording of data to the recorded video data buffer 229 occurs uninterrupted until the video recording handset 100 participates in a telecommunication event (e.g., a telephone call) or the video recording headset 100 receives a video control command that indicates that recording should be stopped (a "record disable video control command").

If a video control command is received, then flow moves to block 440 and the processor 210 identifies the command. Although not illustrated, if the command is a record disable video control command, the video recording is disabled. In addition, if the command indicates to power down the video recording headset 100, the video recording headset 100 will power down and the operations stop.

If the video control command is an instant-clip video control command, then flow moves to operation 445 and the processor 210 identifies a logical segment of the recorded video data buffer 229 corresponding to a predefined amount of video relative to a reference time that is based on the time at which the instant-clip video control command was received or processed. In some embodiments the processor 210 processes the instant-clip video control command such that the video clip file 231 includes only the immediately previous recorded video data for the predefined amount of video relative to the reference time. For example, assuming the reference time is equal to zero (t=0), and the predefined amount of video is 30 seconds, the processor 210 defines a starting frame for the video clip file 231 as the frame that was recorded to the video data buffer 229 30 seconds prior to the reference time (t=−30) and the ending frame for the video clip file 231 as the frame that was recorded at the reference time.

In other embodiments, the processor 210 processes the instant-clip video control command such that the video clip file 231 includes some immediately previous recorded video data relative to the reference time and some video data that will be recorded after the reference time. The amount of video used prior to the reference time may be equal to the amount of video used after the reference time. For example, assuming the reference time is equal to zero (t=0), and the predefined amount of video is 30 seconds, the processor 210 defines a starting frame for the video clip file 231 as the frame that was recorded to the video data buffer 229 15 seconds prior to the reference time (t=−15) and the ending frame for the video clip file 231 as the frame that was recorded 15 seconds after the reference time (t=15). In other implementations the amount of video used prior to the reference time is different (larger or smaller) than the amount of video used after the reference time.

In other embodiments, the processor 210 processes the instant-clip video control command such that the video clip file 231 includes only the video frames that are recorded immediately after the reference time up until the predetermined amount of video is met. For example, one again assuming the reference time is equal to zero (t=0), and the predefined amount of video is 30 seconds, the processor 210 defines a starting frame for the video clip file 231 as the frame that was recorded to the video data buffer 229 at the reference frame (t=0) and the ending frame for the video clip file 231 as the frame that was recorded to the video data buffer 229 30 seconds after the reference time (t=30).

In one embodiment, the predefined amount of video is user configurable. For example, a user may configure the predefined amount of video using the video editing and sharing application 360 of the video control peripheral device 201, which may transmit the configuration setting to the video recording headset 100. In addition, the amount of video data (if any) prior to the reference frame and/or the amount of video data (if any) after the reference frame that is used to define the video clip is user configurable in one embodiment (e.g., through use of the video editing and sharing application 360). For example, a user may configure that an instant-clip should include: the last X number of seconds of video data that was recorded immediately prior to the issuance of the instant-clip video control command, the next Y number of seconds of video data that will be recorded immediately after the issuance of the instant-clip video control command, or a combination thereof.

Flow moves from operation 445 to operation 450 where the processor 210 creates a video clip file 231 according to the identified logical segment. In some embodiments, creating the video clip file 231 includes encoding the video data at a different bitrate and/or in a different format to support playback on the video control peripheral device 201.

In some embodiments, creating the video clip file 231 for the identified logical segment also includes generating one or more metadata fields for the video clip file 231. For example, in addition to any metadata that may be associated with the video frames of the of the video clip file 231 (e.g., timestamp, location data, etc.), the processor 210 may associate the created video clip file 231 with one or more of the following information: a time stamp of when the video clip file 231 was created and/or requested; the sharing preferences of the video clip file 231 (e.g., whether the clip is to be shared publicly or privately); the sharing state of the video clip file 231 (e.g., whether the video clip file 231 is to be shared, whether the video clip file 231 has been successfully shared, and/or whether there was an error when sharing the video clip file 231); presence states (e.g., whether the user is currently online and is capable of sharing, whether the user was offline and not capable of sharing when the video clip file 231 was created). This metadata allows the user to prioritize or filter for the video clip files that have been shared with others. By way of example, the metadata may be used in commercial applications where it may be beneficial to know whether a video clip file has been shared (e.g., a video clip related to an insurance claim or medical case). Such metadata also may be an indicator of network presence which can interface to an instant messaging and presence application to add more context to a user's presence, indicating not only that one is online, but online and capable of instant messaging video clips to selected recipients (e.g., online to share video clips).

After the video clip file 231 has been created, flow moves from operation 450 to 455 and the processor 210 stores the video clip file 231 (e.g., in the storage medium 228 or other storage of the video recording headset 100) such that it is partitioned from the video data buffer 229 so it will not be overwritten during the normal course of the cycling of recorded video data through the buffer 229. Thus, the video data encompassed by the starting frame and the ending frame is saved as a video clip file 231.

The operations described in reference to the instant-clip video control command provides a simple way for a user to create a video clip file for events that were just witnessed and/or events that may occur in the very near future. For example, when a user wants to capture a moment and save a video clip file, they can simply cause an instant-clip video control command to be issued (e.g., either from a push of a button on the video recording headset 100 or selection of a virtual button on the video control peripheral device 201) and a video clip file 231 will be generated.

With reference back to operation 440, if the video control command is an instant-scoop video control command, the flow moves to operation 460. At operation 460, the processor 210 identifies a logical segment of recorded video (which may be stored in the video buffer 229 or may be stored in one of the video clip files 231) for a predefined amount of video relative to a frame of interest. In one embodiment, the frame of interest is included in the video control command.

Figure 5:
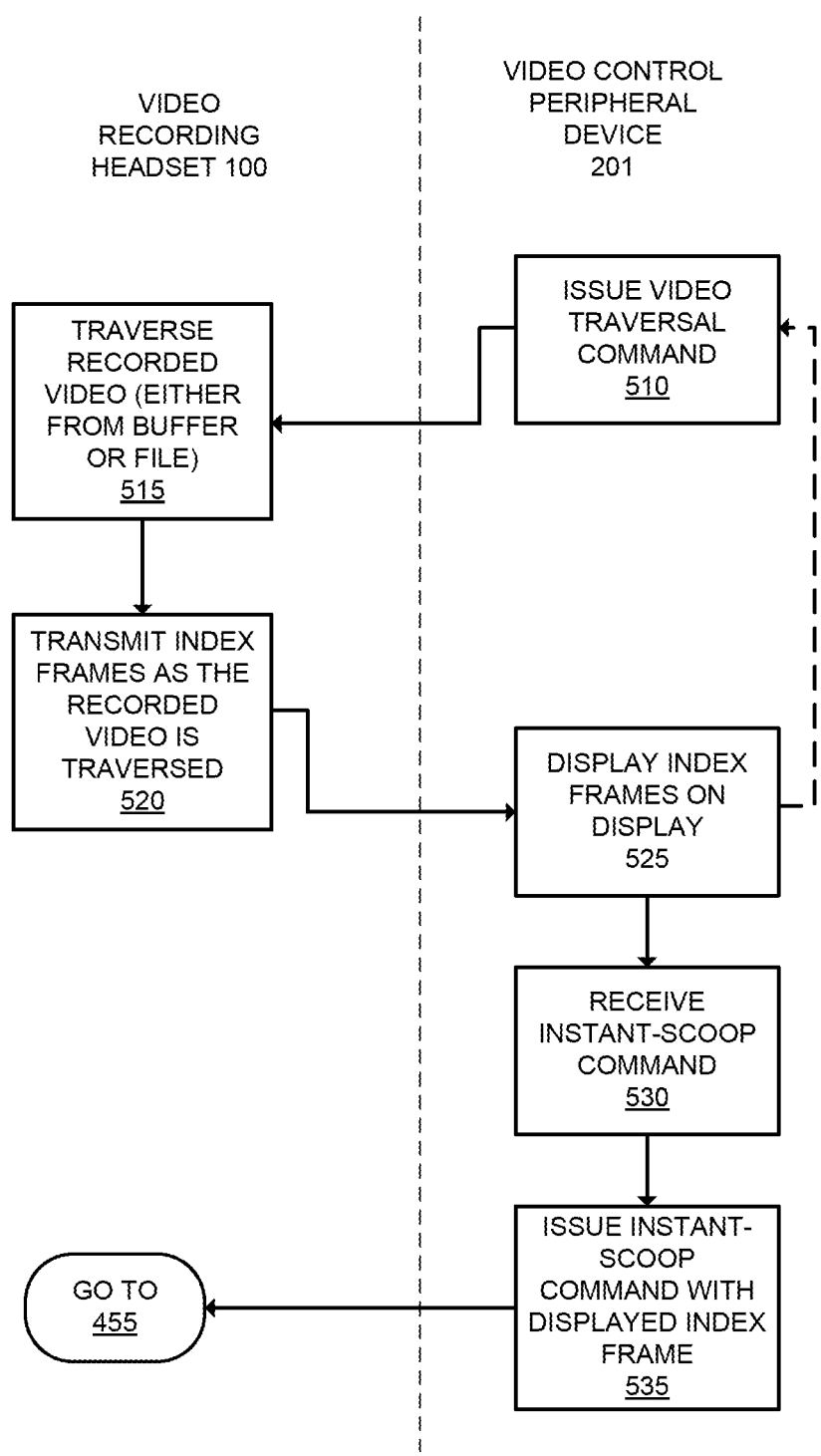
FIG. 5 is a flow diagram illustrating exemplary operations between the video recording headset and a video control peripheral device to issue an instant-scoop video control command according to one embodiment of the present invention.

To issue an instant-scoop video control command, a user typically uses the video control peripheral device 201 to seek through recorded video to find a segment of interest and then presses an instant-scoop button (one of the editing and/or sharing keys 320) causing the command to be transmitted to the video recording headset 100. FIG. 5 illustrates an exemplary flow of operations between the video recording headset 100 and the video control peripheral device 201 to issue an instant-scoop video control command according to one embodiment.

At operation 510, a user using the video control peripheral device 201 causes a video traversal video control command to be transmitted from the video control peripheral device 201 to the video recording headset 100. The user may be traversing video in the recorded video recording buffer 229 or may be traversing one of the video clip file(s) 231. Thus, the video traversal video control command identifies the source of the relevant video. With reference to FIG. 3, the user uses one or more of the video control soft keys 307 to traverse through the video.

The video recording headset 100 traverses the video as instructed by the video traversal control command at operation 515. For example, the processor 210 accesses the recorded video data buffer 229 or the appropriate video clip file 231 to access the appropriate frames. Flow then moves to operation 520 and the video recording headset 100 transmits one or more video frames to the video control peripheral device 201 for display (e.g., on the view screen 303). In one embodiment, the processor 210 is configured to transmit I-frames accessed from the recorded video data buffer 229 or the appropriate video clip file 231 as the buffer is traversed to allow the use to visually index through the video data stored in the recorded video data buffer 229. Operation then flows to block 525 where the video control device 201 displays the transmitted video frame(s). It should be understood that the traversal process described in operations 510-525 may repeat a number of times (e.g., until the user locates the desired segment of interest of video).

At operation 530, the video control peripheral device 201 receives an instant-scoop video control command from the user. For example, the user has located a video segment of interest and has selected an instant-scoop button (from one of the editing and/or sharing key(s) 320). The video control peripheral device 201 then transmits the instant-scoop video control command to the video recording headset 100 at operation 535. The instant-scoop video control command includes the displayed index frame when the command was received by the user. This frame is sometimes referred herein as the frame of interest. Flow then moves to operation 460, described above, where the processor 210 identifies a logical segment of recorded video for a predefined amount of video relative to the frame of interest. For example, the processor 210 automatically generates a starting frame and ending frame for the video clip file based on the frame of interest. In one embodiment, responsive to receiving the instant-scoop video control command, the video recording headset 100 creates a video clip file of a maximum predefined size or duration with video data immediately before and after the frame of interest. Thus in this embodiment the created video clip file includes some amount of video immediately prior to the frame of interest and some amount of video directly after the frame of interest. The amount of video before the frame of interest may be different than the amount of interest after the frame of interest. In another embodiment, responsive to receiving the instant-scoop video control command, the video recording headset 100 creates a video clip file of a maximum predefined size or duration that includes the frame of interest and only the video immediately prior to the frame of interest. In another embodiment, responsive to receiving the instant-scoop video control command, the video recording headset 100 creates a video clip file of a maximum predefined size or duration that includes the frame of interest and only the video immediately following the frame of interest.

Flow then moves to operation 465 and the processor 210 creates a video clip file 231 according to the identified logical segment. In some embodiments, creating the video clip file 231 includes encoding the video data at a different bitrate and/or in a different format to support playback on the video control peripheral device 201. In some embodiments, creating the video clip file 231 for the identified logical segment also includes generating one or more metadata fields for the video clip file 231. For example, in addition to any metadata that may be associated with the video frames of the of the video clip file 231 (e.g., timestamp, location data, etc.), the processor 210 may associate the created video clip file 231 with one or more of the following information: a time stamp of when the video clip file 231 was created and/or requested; the sharing preferences of the video clip file 231 (e.g., whether the clip is to be shared publicly or privately); the sharing state of the video clip file 231 (e.g., whether the video clip file 231 is to be shared, whether the video clip file 231 has been successfully shared, and/or whether there was an error when sharing the video clip file 231); presence states (e.g., whether the user is currently online and is capable of sharing, whether the user was offline and not capable of sharing when the video clip file 231 was created).

After the video clip file 231 has been created, flow moves from operation 465 to 470 and the processor 210 stores the video clip file 231 (e.g., in the storage medium 228 or other storage of the video recording headset 100) such that it is partitioned from the video data buffer 229 so it will not be overwritten during the normal course of the cycling of recorded video data through the buffer 229. Thus, the video data encompassed by the starting frame and the ending frame is saved as a video clip file 231.

The operations described in reference to the instant-scoop video control command provides a simple way for users to create video clip files from recorded video data (e.g., video data recorded in the recorded video data buffer 229, video data from a video clip file 231, or other video data stored on the video recording headset 100) without requiring the users to indicate a starting point and ending point for the video clip. For example, when a user wants to create a video clip from recorded data, they seek through the video that contains the desired clip data (e.g., using one or more video control soft keys 307) until a specific segment of interest is located. When the specific segment is located, the user presses a single button (e.g., an instant-scoop button on the video editing and sharing application 360) that causes an instant-scoop video control command to be issued to the video recording headset 100 and a video clip made in reference to that specific segment of interest. Thus, unlike prior art video editing applications that require a user to specifically input a starting point and ending point, the instant-scoop video control command described herein allows a user to input only a single reference point (namely a segment of interest) and the video recording headset 100 automatically creates a starting frame and ending frame for the video clip. In addition, it should be understood that in some implementations the video control peripheral device 201 has a relatively small touchscreen for a display (e.g., it is a handheld communication device such as a smartphone) that can make seeking through the video to find the starting frame and the ending frame of the clip difficult or cumbersome (this may be especially true if the video clip is of a relatively small duration such as 30 seconds). Thus, the ability to create a video clip requiring only a user to locate a segment of interest allows video clips to be created more simply than prior art video editing applications.

Figure 6:
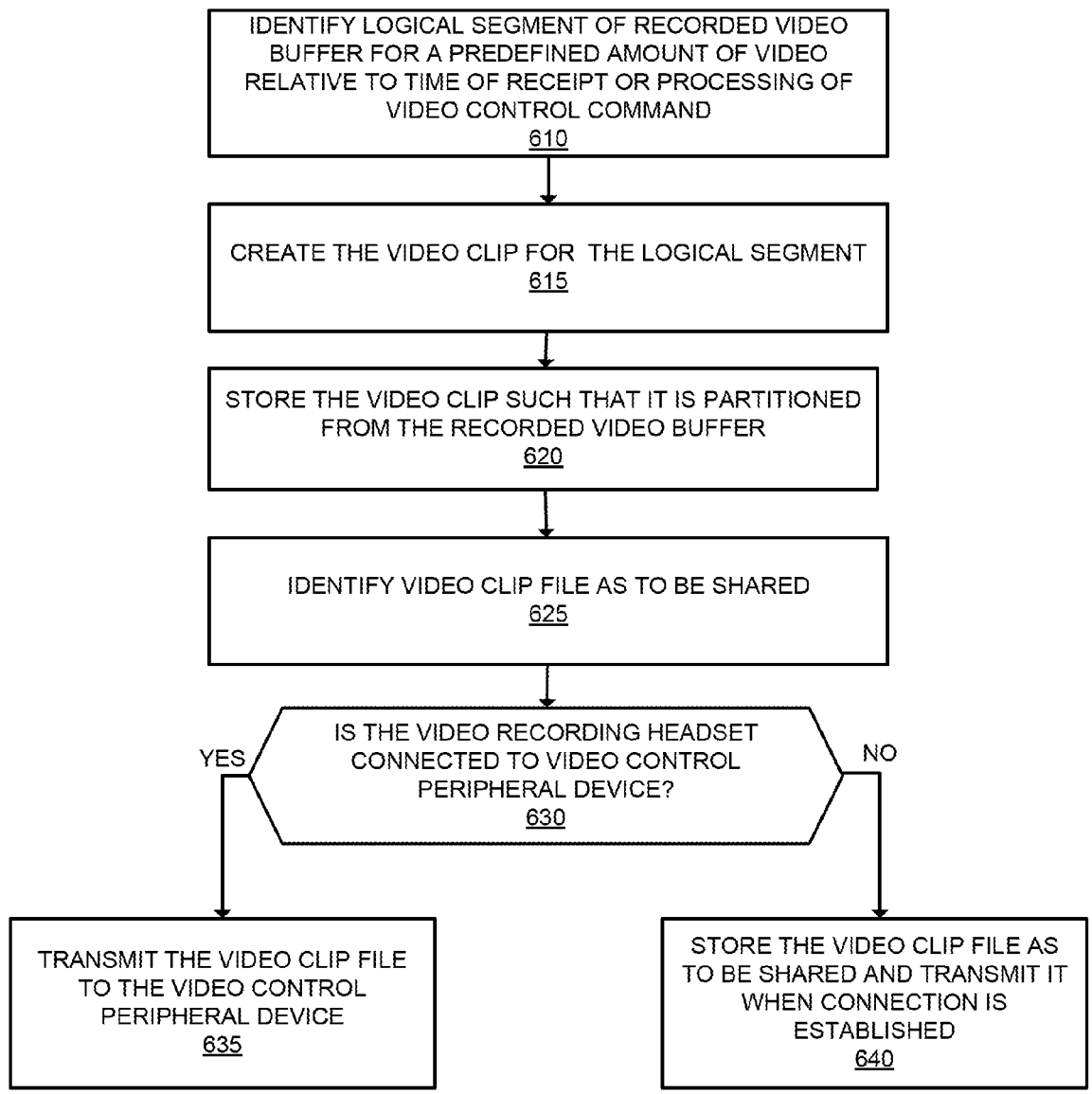
FIG. 6 illustrates exemplary operations performed on a video recording headset for creating and sharing video clips responsive to receipt of an instant-clip and share video control command according to one embodiment of the present invention.

Referring back to operation 440, if the video control command is an instant-clip and share video control command, then flow moves to block 610 of FIG. 6. FIG. 6 illustrates exemplary operations performed on a video recording headset for creating and sharing video clips according to one embodiment. The operations of FIG. 6 will be described with reference to the exemplary embodiments of FIGS. 2 and 3. However, it should be understood that the operations of FIG. 6 can be performed by embodiments of the invention other than those discussed with reference to FIGS. 2 and 3 and the embodiments discussed with reference to FIGS. 2 and 3 can perform operations different than those discussed with reference to FIG. 6.

As previously described, the instant-clip and share video control command is similar to the instant-clip video control command but includes additional operations to share the created video clip with one or more destinations (e.g., email recipient(s), text message recipient(s), social networking website(s), video sharing website(s), etc.). At operation 610, the processor 210 identifies a logical segment of the recorded video data buffer 229 corresponding to a predefined amount of video relative to a reference time that is based on the time at which the instant-clip and share video control command was received or processed in similar way as described with reference to operation 445. Flow then moves to operation 615 and the processor 210 causes a video clip file 231 to be created for the identified logical segment in a similar fashion as was described with reference to operation 450. Flow then moves to operation 620 and the processor 210 stores the video clip file 231 such that it is partitioned from the video data buffer 229 in a similar way as described with reference to operation 455.

Flow moves from operation 620 to operation 625 and the processor 210 causes the video clip file 231 to be identified as to be shared. For example, the metadata associated with the video clip file 231 is set to indicate that the video clip file 231 is to be shared. Flow then moves to operation 630 where a determination is made whether the video recording headset 100 is currently connected to the video control peripheral device 201 (either wirelessly or through a wired connection). If it is, then flow moves to operation 635 and the video clip file 231 is transmitted to the video control peripheral device 201. If it is not, then flow moves to operation 640 and the video clip file 231 is stored and queued to be shared and will transmit it to the video control peripheral device 201 when the connection is established.

Figure 7:
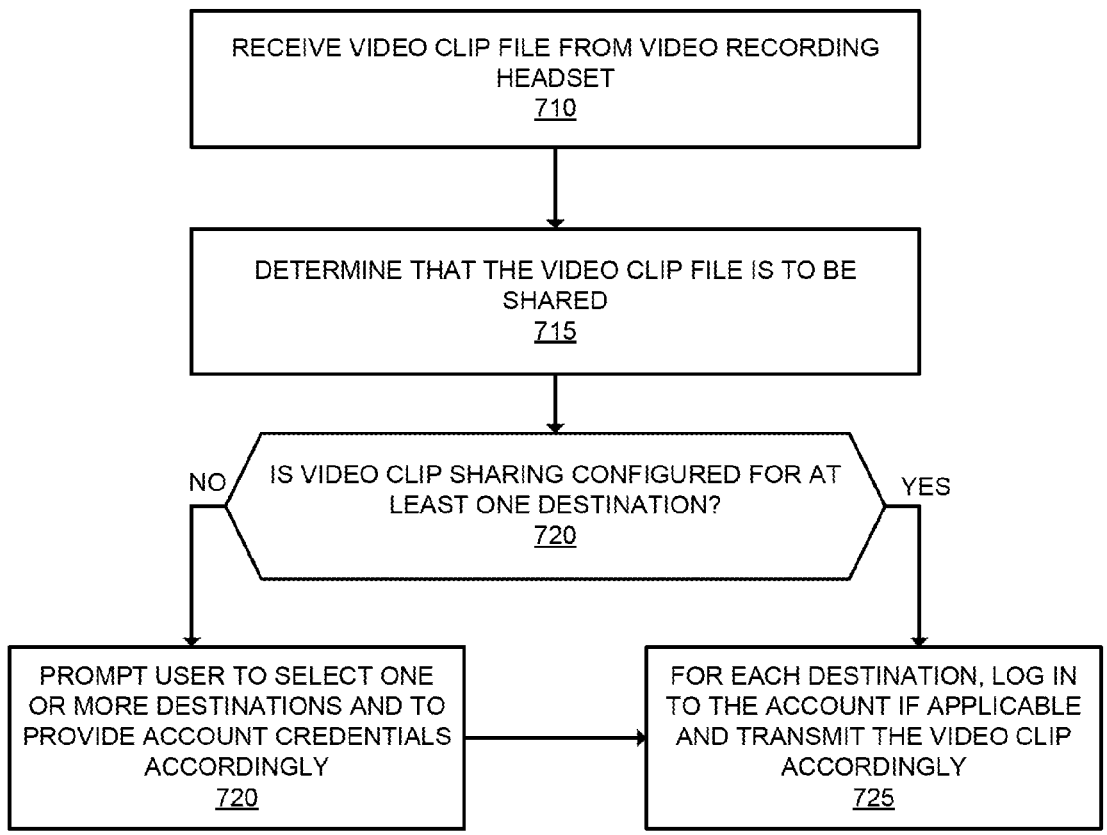
FIG. 7 is a flow diagram that illustrates exemplary operations performed by the video control peripheral device to share a video clip file that is received from the video recording headset according to one embodiment of the present invention.

FIG. 7 is a flow diagram that illustrates exemplary operations performed by the video control peripheral device 201 to share a video clip file 231 that is received from the video recording headset 100 according to one embodiment. At operation 710, the video control peripheral device 201 receives a video clip file 231 from the video recording headset 100. Flow then moves to operation 715 where the video control peripheral device 201 determines that the video clip file 231 is to be shared. For example, the video control peripheral device 201 examines the metadata associated with the video clip file 231 which indicates that the video clip file 231 is to be shared.

Flow then moves to operation 720 and the video control peripheral device 201 determines whether video clip sharing has been configured for at least one destination. For example, a user may use the video editing and sharing application 360 to configure video clip sharing including defining one or more video sharing destination(s). If video clip sharing has been configured for at least one destination, then flow moves to operation 725 and for each destination, the video control peripheral device 201 logs into the account of the destination (if applicable) and transmits the video clip file 231 accordingly. If video clip sharing has not been configured, then flow moves to operation 720 and the video control peripheral device 201 prompts the user to select one or more destinations and to provide account credentials accordingly. Once the user has completed this, flow moves to operation 725 and the video clip file is transmitted to the destination(s) accordingly. The video control peripheral device 201 typically transmits the video clip file using its current Internet connection. For example, if the video control peripheral device 201 is currently connected to the Internet through a cellular connection, that connection will be used to transmit the video clip. In other embodiments, the video control peripheral device 201 transmits the video clip file through a Wi-Fi connection or other non-cellular connection if available, and if not available, transmits the video clip file through a cellular connection.

Thus, the operations described in reference to the instant-clip and share video control command provide a simple way for a user to both create a video clip for events that were just witnessed and/or events that may occur in the very near future, and share the created video clip to one or more destinations. In addition, after the user has configured video clip sharing on the video control peripheral device, the sharing is done automatically without further intervention.

In some embodiments, the user may use the video editing and sharing application 360 to create one or more sharing groups. For example, a sharing group for friends can be created with contacts that are friends and a sharing group for work can be created for work related contacts. In such embodiments, upon receiving an video clip that is to be shared, the video editing and sharing application 360 prompts the user to select a sharing group or select one or more contacts to share the video clip with.

Figure 8:
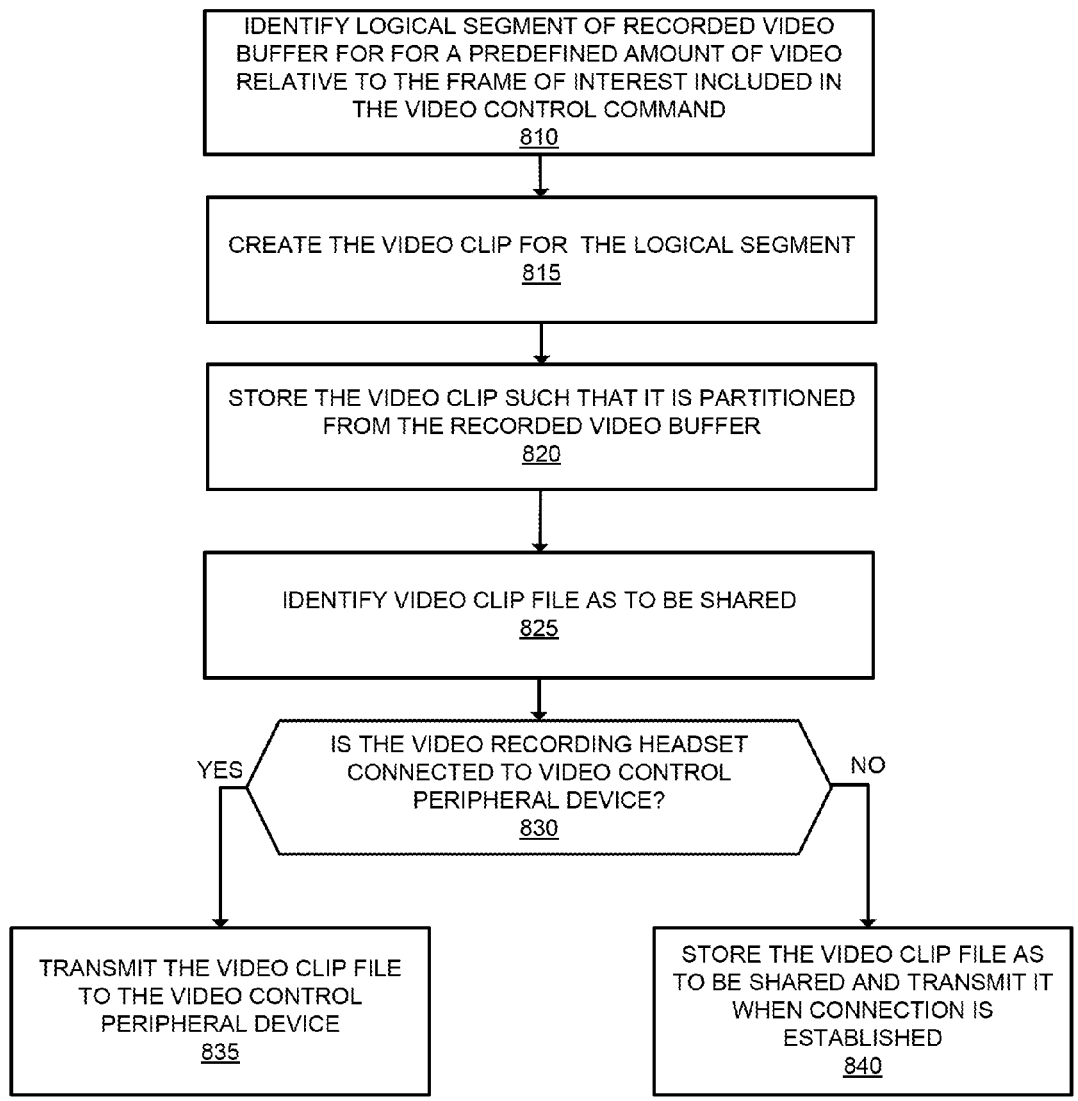
FIG. 8 illustrates exemplary operations performed on a video recording headset for creating and sharing video clips responsive to receipt of an instant-scoop and share video control command according to one embodiment of the present invention.

The video clips that are created as a result of an instant-scoop video control command can also be shared with one or more destinations. Referring back to operation 440, if the video control command is an instant-scoop and share video control command, then flow moves to block 810 of FIG. 8. FIG. 8 illustrates exemplary operations performed on a video recording headset for creating and sharing video clips according to one embodiment. The operations of FIG. 8 will be described with reference to the exemplary embodiments of FIGS. 2 and 3. However, it should be understood that the operations of FIG. 8 can be performed by embodiments of the invention other than those discussed with reference to FIGS. 2 and 3 and the embodiments discussed with reference to FIGS. 2 and 3 can perform operations different than those discussed with reference to FIG. 8.

At operation 810, the processor 210 identifies a logical segment of recorded video (which may be stored in the video buffer 229 or may be stored in one of the video clip files 231) for a predefined amount of video relative to a frame of interest in a similar way as described in reference to operation 460. Flow then moves to operation 815 and the processor 210 creates a video clip file 231 according to the identified logical segment in a similar way as described in reference to operation 465. Flow then moves to operation 820 and the processor 210 stores the video clip file 231 such that it is partitioned from the video data buffer 229 in a similar way as described with reference to operation 470. Flow then moves to operation 825.

At operation 825, the processor 210 causes the video clip file 231 to be identified as to be shared. For example, the metadata associated with the video clip file 231 is set to indicate that the video clip file 231 is to be shared. Flow then moves to operation 830 where a determination is made whether the video recording headset 100 is currently connected to the video control peripheral device 201 (either wirelessly or through a wired connection). If it is, then flow moves to operation 835 and the video clip file 231 is transmitted to the video control peripheral device 201. If it is not, then flow moves to operation 840 and the video clip file 231 is stored and queued to be shared and will transmit it to the video control peripheral device 201 when the connection is established.

In one embodiment, the video control peripheral device 201 processes video clip files that are to be shared as a result of an instant-clip and share video control command in the same way as video clip files that are to be shared as a result of an instant-scoop and share video control command.

Figure 9:
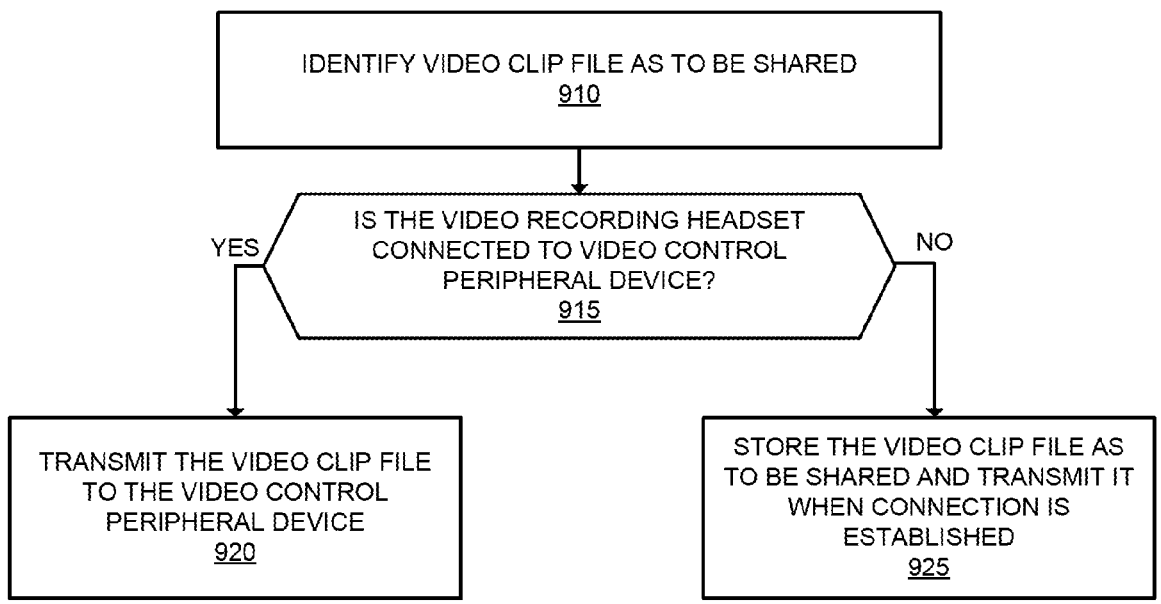
FIG. 9 illustrates exemplary operations performed on a video recording headset for sharing video clips responsive to receipt of a share video control command according to one embodiment of the present invention.

In some embodiments, video clips can be shared with one or more destinations sometime after they have been created and/or shared. For example, a user can scroll through a list of video clip files stored on the video recording headset 100 (e.g., using the video editing and sharing application 360) and select one or more of those video clip files to be shared with one or more destinations. Referring back to operation 440 of FIG. 4, if the video control command is a share video control command, then flow moves to operation 910. FIG. 9 illustrates exemplary operations performed on a video recording headset for sharing video clips according to one embodiment. The operations of FIG. 9 will be described with reference to the exemplary embodiments of FIGS. 2 and 3. However, it should be understood that the operations of FIG. 9 can be performed by embodiments of the invention other than those discussed with reference to FIGS. 2 and 3 and the embodiments discussed with reference to FIGS. 2 and 3 can perform operations different than those discussed with reference to FIG. 9.

At operation 910, the processor 210 identifies those video clip file(s) that are to be shared accordingly. For example, for each video clip file that is to be shared, the video clip the metadata associated with that video clip file is set to indicate that it is to be shared. The metadata may also indicate a time of the sharing request (receipt or processing of the share video control command). Flow then moves to operation 915 where a determination is made whether the video recording headset 100 is currently connected to the video control peripheral device 201 (either wirelessly or through a wired connection). If it is, then flow moves to operation 920 and the video clip file 231 is transmitted to the video control peripheral device 201. If it is not, then flow moves to operation 925 and the video clip file 231 is stored and queued to be shared and will transmit it to the video control peripheral device 201 when the connection is established.

Figure 10:
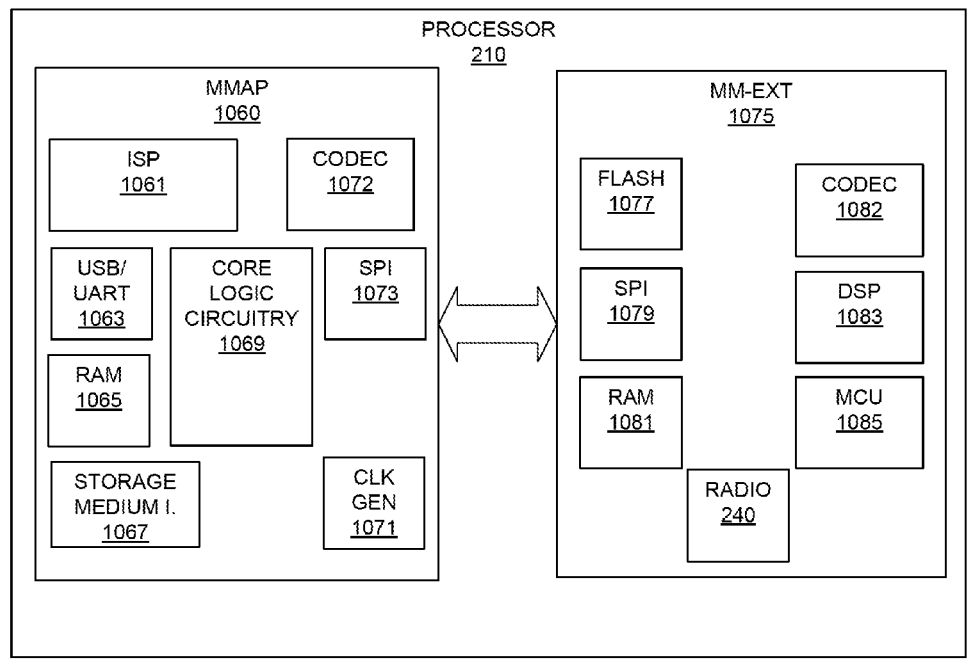
FIG. 10 depicts a functional block diagram of a processor of the wireless video recording headset depicted in FIG. 2, in accordance with an embodiment of the present invention.

FIG. 10 illustrates a functional block diagram of the processor 210, in accordance with one exemplary embodiment of the present invention. As shown the functionality of the processor 210 is provided by a multi-media application processor (MMAP) 1060, such as the CL9020 chip, commercially available from Corelogic, Inc. optionally paired with a multimedia extension (MM-EXT) 1075, such as the W99702G chip, commercially available from Winbond, Inc. or the PAP1302BM chip, commercially available from Pixart, Inc. It will be appreciated however, that various functionalities may be incorporated into any number of different application processing platforms and the present invention is not limited in this respect. The exemplary MMAP 1060 includes at least one image signal processor (ISP) 1061 to which the input image signal 209 is coupled. Any ISP known in the art may be employed as ISP 1061. MMAP 1060 further includes CODEC 1072 to perform compression and/or decompression of video data 216. Alternatively, core logic circuitry 1069 may execute software to perform known compression/decompression algorithms. MMAP 1060 includes a clock generator 1071, platform support for USB/UART communication via USB/UART chip 1063, RAM 1065, and storage medium interface 1067 through which the MMAP 1060 may interface with the storage medium 228. MMAP 1060 also includes core logic circuitry 1069 capable executing one or more of the processing functions described herein and a serial peripheral interface bus (SPI) 1073 through which the MMAP 1060 may be coupled to the MM-EXT 1075.

In the exemplary embodiment depicted, MM-EXT 1075 is integrated with the wireless radio 240 as well as one or more the digital processing functions of the processor 210. MM-EXT 1075 further includes CODEC 1082 to perform compression and/or decompression of the audio data 212. DSP 1083 is to perform various ADC/DAC of the audio data 212 and/or video data 216. MM-EXT 1075 further includes RAM 1081, NVRAM (flash) 1077, SPI 1079, and a microcontroller unit (MCU) 1085 providing logic circuitry to execute any one of the functions described herein.

Headset software may be executable out of RAM 1081 and a boot-loader may load a real-time operating system (RTOS) from NVRAM 1077 into RAM 1081 before the RTOS gains control. The operating system supported on the microcontroller may be any conventional platform, such as the Embedded Configurable Operating System (ECOS). Depending on the embodiment, the OS may provide any of the following: UART to Bluetooth Module control; clocking functions; memory management (e.g., a flash file system or a handling of a set of limited files); media data format conversions (e.g., MPEG-4, H.264 to lower frame rates); library and codec functions (e.g., ffmeg); interfacing the microphone 230; and multi-threading to enable the applications described herein; as well as any other conventional operating system function, such as error handling.

In an embodiment, the headset 100 includes application software, which may be configured as a set of multiple modules, which provides instructions executed by the processor 210 (e.g., MMAP 1060 and/or MM-EXT 1075) to communicate via the radio 240; interface to the storage medium 228 (flash file system) to record, access or manage video and/or audio data stored on the storage medium 228; provide directory services for stored video and/or audio data (e.g., with time stamp, file size or other metadata); communicate with the video control peripheral device 201 to obtain a time-of-day, phone number, geolocation data discovered by the video control peripheral device 201, or other external reference which may be incorporated into the A/V file and updated during video capture; or interface with an application of the video control peripheral device 201. In an exemplary embodiment, application software manages execution of video control commands 218 including the instant-clip video control command, the instant-clip and share video control command, the instant-scoop video control command, the instant-scoop and share video control command, and the share video control command. In addition, application software manages execution of video control commands 218 to: start recording a video clip, stop recording a video clip; list clips stored (which may include the first frame of the clip); download frames from the recorded video data buffer 229 to the handheld device in a preview format (e.g., down-convert a single I-frame, or down-convert to 4 frames/sec); use preview format frames to define a clip from the circular buffer, which prevents that part of the buffer from being overwritten; download a full/partial video clip file 231 to the video control peripheral device 201 at a predetermined resolution (which may be lower than the recorded resolution); download a full rate video frames from the recorded video data buffer 229 to a wireless enabled device (e.g., a WiFi-enabled device) at a predetermined resolution; and provide device management information (e.g., status queries and reports regarding availability or video and/or audio portion of the headset 100 or charge level of battery 250).

Figure 11:
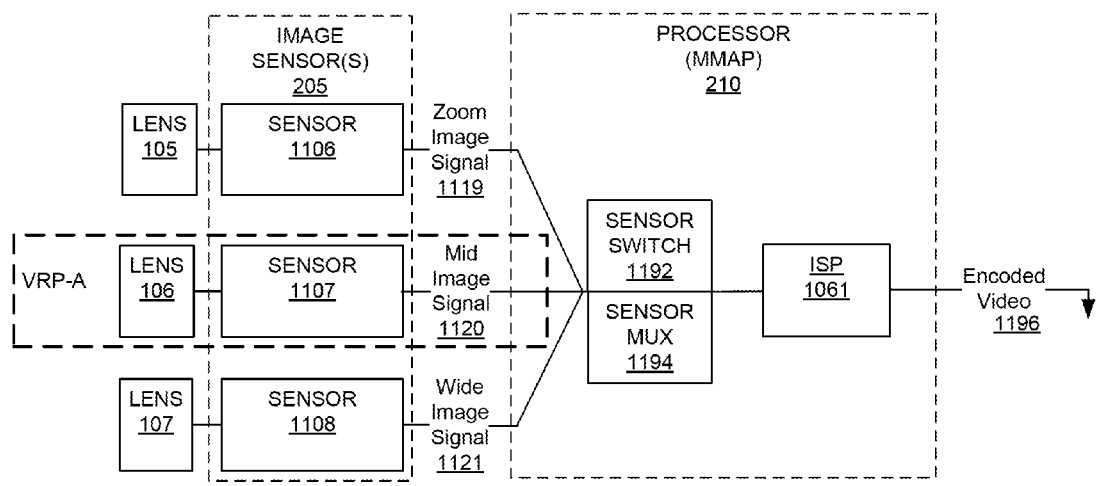
FIG. 11 depicts a function block diagram of components in a video data collection pipeline of the wireless video recording headset depicted in FIG. 2, in accordance with an embodiment of the present invention.

FIG. 11 depicts a functional block diagram of video data collection components in the video recording pipeline (VRP)

of the video recording headset 100, in accordance with an exemplary embodiment of the present invention. One or more of these video data collection components may be powered down by the processor 210 in response a determination the battery 250 has a low charge level so that the wireless transceiver may remain operable to relay the input and output audio signals between the headset 100 and the video control peripheral device 201. Generally, the headset 100 includes an imager comprising the lens 105 and the image sensor 205, such as a charge coupled device (CCD) or CMOS image sensor to form an image circle, for example of approximately 3 mm. In a particular embodiment, VGA design and lens quality is utilized, although any imager resolution may be utilized in alternative embodiments, as a matter of design choice. In the exemplary embodiment shown, a parallel VRP is utilized in which the headset 100 includes a lens 106 and a lens 107 in parallel with the lens 105. In an alternate embodiment, the parallel VRP is simplified to include a single video recording pipeline, such as that highlighted as VRP-A. The material for the lens 105 may be the same for lens 106 and 107, such as acrylic (PMMA) and/or polycarbonate and may be molded as a single piece, (e.g., monolithic). In one embodiment, a conventional cell phone camera chip and injection molded lens is utilized.

In one multi-lens embodiment, each lens is coupled in parallel to a separate image sensor array of the image sensor 205 (e.g., sensor array 1106, sensor array 1107 and sensor array 1108). In one VGA embodiment, each sensor array 1106, 1107 and 1108 is a 640×480 array of CMOS sensors that have pixel separation of approximately 3.6 microns. Electronic Image Stabilization utilizing the dark space of the focal plane array of any of the sensor arrays 1106-1108 may also be utilized in any fashion known in the art. The image sensor arrays 1106, 1107 and 1108 may be disposed on a same board coupled to the processor 210 via a flexible circuit board. In one such embodiment, the plurality of parallel lens/imager pairs is to provide a switched optical zoom capability in the headset 100. As illustrated, the image sensor array 1106 is connected to the lens 105 to provide a first fixed focal length to output a zoom image signal 1119, with a 20 degree field of view (FOV) for example. The image sensor array 1108 is connected to lens 107 to provide a second fixed focal length to output a wide angle image signal 1121, with an 80, 90, or 100 degree FOV, for example. The image sensor array 1107 is connected to lens 106 to provide a third fixed focal length to output a mid angle image signal 1120, with a 60 degree FOV, for example. The three lenses may, in combination, provide for at least a $5^\times$ optical zoom range ($+/-2.5^\times$) with a variable resolution (narrow FOV has high resolution for embodiments where the sensor arrays 1106-1108 have the same cell count). In one exemplary 3-channel embodiment, the wide angle lens 105 has a focal length of approximately 1.3 mm and the zoom lens 107 has a focal length of greater than 8 mm, each with an F-number of 2.7.

The multiple imaging channels allow for the three channels to be switched (e.g., zoom command selects an image sensor array 1106-1108) to provide optical zoom in contrast to a convention single movable lens arrangement which would require an optical path that is disadvantageously long for a small headset form factor. Each image signal channel may be independently focused or focused in unison, depending on the optical path/elements employed to provide a range of depth of field (DOF) over the range of FOV. A digital zoom may also be utilized between the fixed optical FOV to provide a smooth transition in video recorded as the optical zoom is switched between the fixed focal length channels. In certain embodiments, one or more of the lenses 105-107 may be disposed on a boom extending from a main body of the headset 100 to allow for an extended optical path conducive to optical zooms of at least 10× or for large fields of view where the front element needs to be located in a position where the environment does not obstruct the field of view.

As depicted in FIG. 11, each image signal 1119-1121 is coupled to a same image signal processor (ISP) 1061. In other multi-lens embodiments, however, the parallel VRP may alternatively include a plurality of ISPs, with a separate ISP coupled to each image signal 1119-1121. For multi-lens embodiments, the processor 210 includes a sensor switch 1192 to switch between the image signals 1119, 1120 and 1121 and multiplexer 1194 to multiplex the image signals 1119, 1120 and 1121. In one embodiment, the processor 210 is to switch, in response to receiving a video control command 218, between the wide angle image signal 1121 and the zoom image signal 1119 to output an encoded video stream 1196 at only at a particular zoom to be stored to the storage medium 228. In an alternative embodiment, video data is captured at the different FOV simultaneously. In one such embodiment, the sensor multiplexer 1194 outputs the encoded video stream 1196 as a time division multiplexed (TDM) data stream to be stored to the storage medium 228. Recorded frames may be interleaved between the plurality of image capturing channels. Recorded video may then be saved off as a video clip file 231 at any of the plurality of DOF/FOV to allow for space shifting the video clip file. For example, in one embodiment, processor 210 is to demultiplex the multiplexed video data recorded from the storage medium 228, in response to receiving a video control command 218 selecting a zoom to partition, as a video clip file, a logical segment of the stored video data. As such, the DOF and FOV of video recorded to the recorded video data buffer 229 is not necessarily set as it is in conventional video recording cameras and instead a desired DOF and FOV may be selected during a video clip definition process rather than, or in addition to, during a video capture process. For embodiments where the video data is captured at the different FOV simultaneously, a single image stream may also be assembled from all three image capture channels with the three different planes of focus to provide images having a depth of field exceeding that of any one of the lenses 105-107.

Figure 12A:
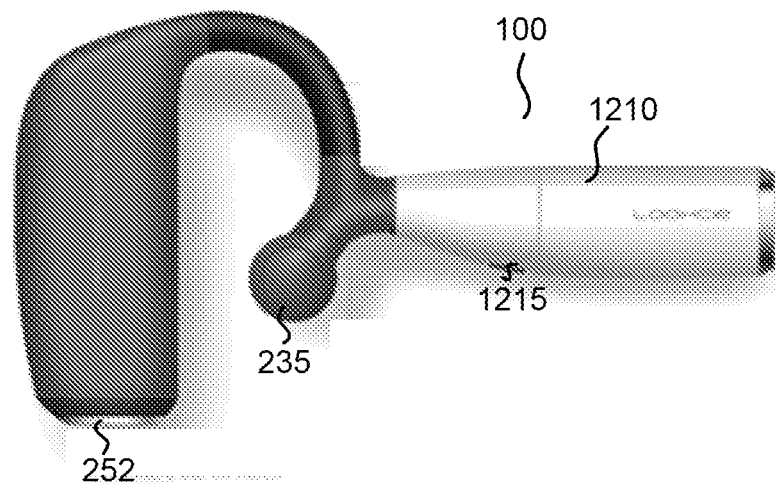
FIG. 12A illustrates a view of the exterior of an exemplary video recording headset according to one embodiment of the present invention.
Figure 12B:
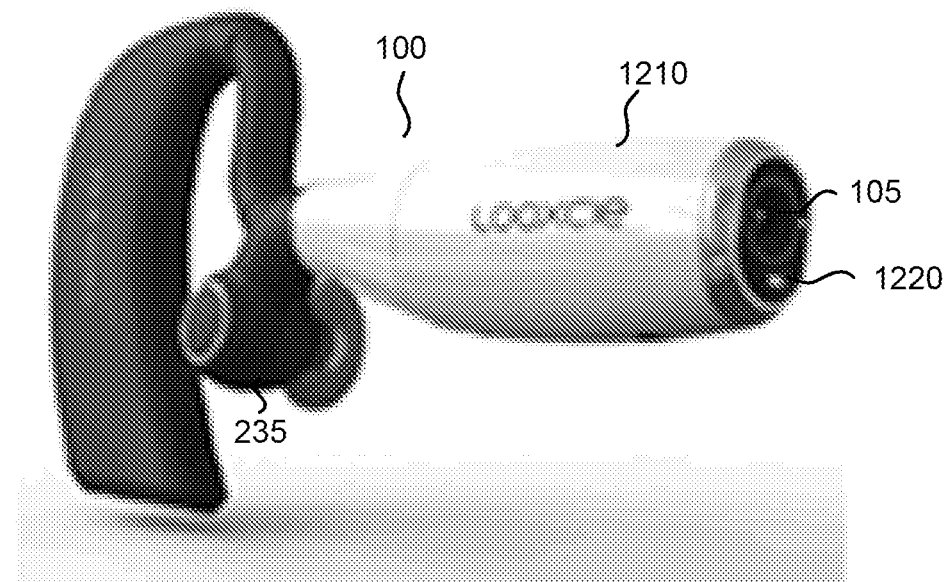
FIG. 12B illustrates a different view of the exterior of an exemplary video recording headset according to one embodiment of the present invention.

FIG. 12A-B illustrate the exterior of an exemplary video recording headset according to one embodiment. As illustrated in FIGS. 12A-B, the video recording headset 100 includes the video boom 1210 that includes components for video recording described herein including the camera lens 105 to collect image information, the speaker earpiece 235 to provide an output audio signal, the USB/Charger interface 252 to provide a wired connection to a video control peripheral device or charger, and the clip creation button 1215. In one embodiment, a user pressing the clip creation button 1215 causes an instant-clip video control command to be issued and a user pressing and holding the clip creation button 1215 for some amount of time (e.g., a few seconds) causes an instant-clip and share video control command to be issued. Also as illustrated in FIG. 12B, the video recording headset 100 includes the recording indicator light 1220 that illuminates when the video recording headset 100 is recording. In one embodiment, the video recording headset 100 flashes when an instant-clip video control command or an instant-clip and share video control command is issued.

In some embodiments, the amount of predefined amount of video for the video clips can be incremented by logical sequences of input by a user. For example, repeated selection of the instant-clip physical button on the video recording headset 100 or the virtual instant-clip button on the video control peripheral device 201 may increment the time duration of the resulting video clip by an amount of time (e.g., 30 seconds).

Embodiments of the present invention may include apparatuses for performing the operations herein. An apparatus may include programmable logic circuitry selectively activated or reconfigured by a program stored in the device. Such a program may be stored on a computer readable storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more computing devices (e.g., a video recording headset, a video control peripheral device). Such computing devices store and communicate (internally and/or with other computing devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such computing devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given computing device typically stores code and/or data for execution on the set of one or more processors of that computing device. Of course, one or more parts of an embodiment of the invention may be implemented using different combinations of software, firmware, and/or hardware.

While embodiments have been described herein with reference to a video recording hand-free device that is a video recording headset, it should be understood that other types of video recording hands-free devices can perform the operations described herein with respect to editing and sharing video (e.g., performing an instant-scoop, instant-clip, instant-clip and share, instant-scoop and share) but may not include functionality of an audio headset that acts as an auditory relay between the user's handheld communication device in support of a telecommunication event (e.g., a phone call) in which the user's handheld communication device participates.

While embodiments have been described herein with reference to an instant-scoop to create a video clip file of a predetermined amount of time from video recorded with a hands-free device, embodiments are not so limited. For example, the operations described herein with respect to instant-scoop can be used to create a video clip file of a predetermined amount (as previously described herein) from video that has been recorded by any apparatus. In addition, while embodiments have been describe herein with reference to an instant-scoop and share to both create a video clip file of a predetermined amount from video recorded with a hands-free device and then automatically sharing that video with one or more destinations, embodiments are not so limited as the instant-scoop and share can be extended to create a video clip file of a predetermined amount (as previously described herein) from video that has been recorded by any apparatus and automatically shared with one or more destinations.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A video recording hands-free device, comprising:
a storage medium;
an optical sensor through which the hands-free device is to receive an input image signal;
a processor coupled to the optical sensor and the storage medium, the processor configured to:
process the input image signal received from the optical sensor into an encoded video data stream;
store the encoded video data stream as recorded video data in the storage medium; and
receive and process a video control command to create a video clip file from a logical segment of the recorded video data; and
manage at least a portion of the storage medium as a circular buffer and overwrite the recorded video data stored in a subset of memory addresses corresponding to an older recorded video frame with the encoded video data corresponding to a newer video frame; and
an exterior button to, when pressed by a user of the video recording hands-free device, cause the video control command to be issued to the processor, wherein the video control command is an instant-clip video control command; and
wherein the processor is further configured to process the instant-clip video control command by performing the following:
identify the logical segment to include recorded video data from the circular buffer of a predetermined time interval backward in time from receipt or issuance of the instant-clip video control command;
create the video clip file for the logical segment; and
store the video clip file in the storage medium.

2. The video recording hands-free device of claim 1, wherein the processor is further configured to store the video clip file in a logical partition from the circular buffer such that the recorded video data associated with the video clip is protected from being overwritten by video data subsequently recorded to the circular buffer.

3. A video recording hands-free device, comprising:
a storage medium;
an optical sensor through which the hands-free device is to receive an input image signal;
a processor coupled to the optical sensor and the storage medium, the processor configured to:

process the input image signal received from the optical sensor into an encoded video data stream;

store the encoded video data stream as recorded video data in the storage medium; and receive and process a video control command to create a video clip file from a logical segment of the recorded video data; and manage at least a portion of the storage medium as a circular buffer and overwrite the recorded video data stored in a subset of memory addresses corresponding to an older recorded video frame with the encoded video data corresponding to a newer video frame; and an exterior button to, when pressed by a user of the video recording hands-free device, cause the video control command to be issued to the processor, wherein the video control command is an instant-clip and share video control command; and wherein the processor is further configured to process the instant-clip and share video control command by performing the following:

identify the logical segment to include recorded video data from the circular buffer of a predetermined time interval backward in time from receipt or issuance of the instant-clip video control command, create the video clip file for the logical segment, associate metadata with the video clip file including an indication that the video clip file is to be shared, and transmit the video clip file and its associated metadata to a video control peripheral device to cause the video control peripheral device to share the video clip file with one or more external destinations.

4. The video recording hands-free device of claim 3, wherein the one or more external destinations includes one or more of the following: one or more email recipients, one or more text message recipients, one or more social networking websites, and one or more video sharing websites.

5. A video recording hands-free device, comprising:
a storage medium;
an optical sensor through which the hands-free device is to receive an input image signal;
a processor coupled to the optical sensor and the storage medium, the processor configured to:
process the input image signal received from the optical sensor into an encoded video data stream;
store the encoded video data stream as recorded video data in the storage medium; and
receive and process a video control command to create a video clip file from a logical segment of the recorded video data; and
wherein the video control command is an instant-scoop video control command that is received from a video control peripheral device connected to the video recording hands-free device and that includes a frame of interest; and
wherein the processor is further configured to process the instant-scoop video control command by performing the following:
identify the logical segment to include recorded video data of a first predetermined time interval backward in time from the frame of interest and recorded video data of a second predetermined time interval forward in time from the frame of interest;
create the video clip file for the logical segment; and
store the video clip file in the storage medium.

6. A video recording hands-free device, comprising:
a storage medium;
an optical sensor through which the hands-free device is to receive an input image signal;
a processor coupled to the optical sensor and the storage medium, the processor configured to:
process the input image signal received from the optical sensor into an encoded video data stream;
store the encoded video data stream as recorded video data in the storage medium; and
receive and process a video control command to create a video clip file from a logical segment of the recorded video data; and
wherein the video control command is an instant-scoop and share video control command that is received from a video control peripheral device connected to the video recording hands-free device and that includes a frame of interest; and
wherein the processor is further configured to process the instant-scoop video control command by performing the following:
identify the logical segment to include recorded video data of a first predetermined time interval backward in time from the frame of interest and recorded video data of a second predetermined time interval forward in time from the frame of interest;
create the video clip file for the logical segment;
associate metadata with the video clip file including an indication that the video clip file is to be shared; and
transmit the video clip file and its associated metadata to a video control peripheral device to cause the video control peripheral device to share the video clip file with one or more external destinations.

7. The video recording hands-free device of claim 6, wherein the one or more external destinations includes one or more of the following: one or more email recipients, one or more text message recipients, one or more social networking websites, and one or more video sharing websites.

8. The video recording hands-free device of claim 6, further comprising:
a speaker earpiece through which the hands-free device is to provide an output audio signal;
a microphone through which the hands-free device is to receive an input audio signal;
a wireless transceiver operable to input and output audio signals between the video recording hands-free device and a video control peripheral device during a telecommunication event conducted by the video control peripheral device.

9. A method on a video recording hands-free device to create video clip files, comprising:
receiving an input image signal through an optical sensor of the video recording handsfree device;
processing the input image signal into an encoded video data stream;
storing the encoded video data stream as recorded video data in a storage medium of the video recording hands-free device, wherein at least a portion of the storage medium is managed as a circular buffer such that the recorded video data stored in a subset of memory addresses corresponding to an older recorded video frame is overwritten with encoded video data corresponding to a newer video frame as the hands-free device receives newer video frames;
responsive to receiving input to create a video clip file from a logical segment of the recorded video data, creating the video clip file from the logical segment of the recorded video data, wherein the input is received as a result of a user requesting a video clip file of a predetermined amount of video be created from the circular buffer relative to the time of receipt of the input, and responsive to receiving the input, performing the following:

identifying the logical segment to include recorded video data from the circular buffer of a predetermined time interval backward in time from a time substantially close to receipt of the input;

creating the video clip file for the logical segment; and storing the video clip file in the storage medium.

10. The method of claim 9, wherein the created video clip file is stored in a logical partition from the circular buffer such that the recorded video data associated with the created video clip is protected from being overwritten by video data subsequently recorded to the circular buffer.

11. A method on a video recording hands-free device to create video clip files, comprising:

receiving an input image signal through an optical sensor of the video recording handsfree device;

processing the input image signal into an encoded video data stream;

storing the encoded video data stream as recorded video data in a storage medium of the video recording hands-free device, wherein at least a portion of the storage medium is managed as a circular buffer such that the recorded video data stored in a subset of memory addresses corresponding to an older recorded video frame is overwritten with encoded video data corresponding to a newer video frame as the hands-free device receives newer video frames;

responsive to receiving input to create a video clip file from a logical segment of the recorded video data, creating the video clip file from the logical segment of the recorded video data, wherein the input is received as a result of a user requesting a video clip file of a predetermined amount of video be created from the circular buffer relative to the time of receipt of the input and automatically shared with one or more external destinations, and responsive to receiving the input, performing the following:

identifying the logical segment to include recorded video data from the circular buffer of a predetermined time interval backward in time from a time substantially close to receipt of the input;

creating the video clip file for the logical segment;

associating metadata with the video clip file including an indication that the video clip file is to be shared; and transmitting the video clip file and its associated metadata to a video control peripheral device to cause the video control peripheral device to share the video clip file with one or more external destinations.

12. The method of claim 11, wherein the one or more external destinations includes one or more of the following: one or more email recipients, one or more text message recipients, one or more social networking websites, and one or more video sharing websites.

13. A method on a video recording hands-free device to create video clip files, comprising:

receiving an input image signal through an optical sensor of the video recording handsfree device;

processing the input image signal into an encoded video data stream;

storing the encoded video data stream as recorded video data in a storage medium of the video recording hands-free device;

responsive to receiving input to create a video clip file from a logical segment of the recorded video data, creating the video clip file from the logical segment of the recorded video data, wherein the input is received as a result of a user requesting a video clip file of a predetermined amount of video be created, and wherein the input further indicates a frame of interest, and responsive to the input, performing the following:

identifying the logical segment to include recorded video data of a first predetermined time interval backward in time from the frame of interest and recorded video data of a second predetermined time interval forward in time from the frame of interest;

creating the video clip file for the logical segment; and storing the video clip file in the storage medium.

14. A method on a video recording hands-free device to create video clip files, comprising:

receiving an input image signal through an optical sensor of the video recording handsfree device;

processing the input image signal into an encoded video data stream;

storing the encoded video data stream as recorded video data in a storage medium of the video recording hands-free device;

responsive to receiving input to create a video clip file from a logical segment of the recorded video data, creating the video clip file from the logical segment of the recorded video data, wherein the input is received as a result of a user requesting a video clip file of a predetermined amount of video be created and automatically shared with one or more external destinations, and wherein the input further indicates a frame of interest, and responsive to the input, performing the following:

identifying the logical segment to include recorded video data of a first predetermined time interval backward in time from the frame of interest and recorded video data of a second predetermined time interval forward in time from the frame of interest;

creating the video clip file for the logical segment;

associating metadata with the video clip file including an indication that the video clip file is to be shared; and transmitting the video clip file and its associated metadata to a video control peripheral device to cause the video control peripheral device to share the video clip file with one or more external destinations.

15. The method of claim 14, wherein the one or more external destinations includes one or more of the following: one or more email recipients, one or more text message recipients, one or more social networking websites, and one or more video sharing websites.

16. The method of claim 14, further comprising:

transmitting to and receiving from a video control peripheral device wirelessly connected to the video recording hands-free device audio signals during a telecommunications event conducted by the video control peripheral device.

17. A non-transitory computer-readable storage medium that provides instructions that, if executed by a processor of a video recording hands-free device, will cause said processor to perform operations comprising:

receiving an input image signal through an optical sensor of the video recording handsfree device;

processing the input image signal into an encoded video data stream;

storing the encoded video data stream as recorded video data in a storage medium of the video recording handsfree device, wherein at least a portion of the storage medium is managed as a circular buffer such that the recorded video data stored in a subset of memory addresses corresponding to an older recorded video frame is overwritten with encoded video data corresponding to a newer video frame as the hands-free device receives newer video frames;

responsive to receiving input to create a video clip file from a logical segment of the recorded video data, creating the video clip file from the logical segment of the recorded video data, wherein the input is received as a result of a user requesting a video clip file of a predetermined amount of video be created from the circular buffer relative to the time of receipt of the input, and responsive to receiving the input, performing the following:

identifying the logical segment to include recorded video data from the circular buffer of a predetermined time interval backward in time from a time substantially close to receipt of the input;

creating the video clip file for the logical segment; and storing the video clip file in the storage medium.

18. The non-transitory computer-readable storage medium of claim 17, wherein the created video clip file is stored in a logical partition from the circular buffer such that the recorded video data associated with the created video clip is protected from being overwritten by video data subsequently recorded to the circular buffer.

19. A non-transitory computer-readable storage medium that provides instructions that, if executed by a processor of a video recording hands-free device, will cause said processor to perform operations comprising:

receiving an input image signal through an optical sensor of the video recording handsfree device;

processing the input image signal into an encoded video data stream;

storing the encoded video data stream as recorded video data in a storage medium of the video recording hands-free device, wherein at least a portion of the storage medium is managed as a circular buffer such that the recorded video data stored in a subset of memory addresses corresponding to an older recorded video frame is overwritten with encoded video data corresponding to a newer video frame as the hands-free device receives newer video frames;

responsive to receiving input to create a video clip file from a logical segment of the recorded video data, creating the video clip file from the logical segment of the recorded video data, wherein the input is received as a result of a user requesting a video clip file of a predetermined amount of video be created from the circular buffer relative to the time of receipt of the input and automatically shared with one or more external destinations, and responsive to receiving the input, performing the following:

identifying the logical segment to include recorded video data from the circular buffer of a predetermined time interval backward in time from a time substantially close to receipt of the input;

creating the video clip file for the logical segment, associating metadata with the video clip file including an indication that the video clip file is to be shared, and transmitting the video clip file and its associated metadata to a video control peripheral device to cause the video control peripheral device to share the video clip file with one or more external destinations.

20. The non-transitory computer-readable storage medium of claim 19, wherein the one or more external destinations includes one or more of the following: one or more email recipients, one or more text message recipients, one or more social networking websites, and one or more video sharing websites.

21. A non-transitory computer-readable storage medium that provides instructions that, if executed by a processor of a video recording hands-free device, will cause said processor to perform operations comprising:

receiving an input image signal through an optical sensor of the video recording handsfree device;

processing the input image signal into an encoded video data stream;

storing the encoded video data stream as recorded video data in a storage medium of the video recording hands-free device;

responsive to receiving input to create a video clip file from a logical segment of the recorded video data, creating the video clip file from the logical segment of the recorded video data, wherein the input is received as a result of a user requesting a video clip file of a predetermined amount of video be created, and wherein the input further indicates a frame of interest, and responsive to the input, performing the following:

identifying the logical segment to include recorded video data of a first predetermined time interval backward in time from the frame of interest and recorded video data of a second predetermined time interval forward in time from the frame of interest;

creating the video clip file for the logical segment; and storing the video clip file in the storage medium.

22. A non-transitory computer-readable storage medium that provides instructions that, if executed by a processor of a video recording hands-free device, will cause said processor to perform operations comprising:

receiving an input image signal through an optical sensor of the video recording handsfree device;

processing the input image signal into an encoded video data stream;

storing the encoded video data stream as recorded video data in a storage medium of the video recording hands-free device;

responsive to receiving input to create a video clip file from a logical segment of the recorded video data, creating the video clip file from the logical segment of the recorded video data, wherein the input is received as a result of a user requesting a video clip file of a predetermined amount of video be created and automatically shared with one or more external destinations, and wherein the input further indicates a frame of interest, and responsive to the input, performing the following:

identifying the logical segment to include recorded video data of a first predetermined time interval backward in time from the frame of interest and recorded video data of a second predetermined time interval forward in time from the frame of interest;

creating the video clip file for the logical segment, associating metadata with the video clip file including an indication that the video clip file is to be shared; and transmitting the video clip file and its associated metadata to a video control peripheral device to cause the video control peripheral device to share the video clip file with one or more destinations.

23. The non-transitory computer-readable storage medium of claim 22, wherein the one or more external destinations includes one or more of the following: one or more email recipients, one or more text message recipients, one or more social networking websites, and one or more video sharing websites.

24. The non-transitory computer-readable storage medium of claim 22, further comprising:
    transmitting to and receiving from a video control peripheral device wirelessly connected to the video recording hands-free device audio signals during a telecommunications event conducted by the video control peripheral device.

* * * * *